(12) United States Patent
Goyal et al.

(10) Patent No.: US 10,778,867 B1
(45) Date of Patent: Sep. 15, 2020

(54) STEGANOGRAPHIC CAMERA COMMUNICATION

(71) Applicant: Amazon Technologies, Inc., Seattle, WA (US)

(72) Inventors: Dushyant Goyal, Redmond, WA (US); Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/267,071

(22) Filed: Feb. 4, 2019

Related U.S. Application Data

(62) Division of application No. 15/078,764, filed on Mar. 23, 2016, now Pat. No. 10,212,306.

(51) Int. Cl.
*H04N 1/32* (2006.01)
*H04N 1/00* (2006.01)

(52) U.S. Cl.
CPC ..... *H04N 1/32352* (2013.01); *H04N 1/00244* (2013.01); *H04N 1/00251* (2013.01); *H04N 1/3224* (2013.01); *H04N 1/32304* (2013.01); *H04N 2201/0084* (2013.01)

(58) Field of Classification Search
CPC ........... G06T 1/0021; G06T 2201/0051; G06T 2201/0061; H04N 1/32144; H04N 1/32203; H04N 1/32208; H04N 1/32229; H04N 1/32235; H04N 1/3224; H04N 1/32304; H04N 2201/3225; H04N 2201/3249; H04N 2201/327; H04N 2201/3274
See application file for complete search history.

(56) References Cited

U.S. PATENT DOCUMENTS

| | | | | |
|---|---|---|---|---|
| 5,809,160 | A * | 9/1998 | Powell et al. | G06Q 20/341 380/54 |
| 6,005,643 | A * | 12/1999 | Morimoto et al. | H04N 19/00 375/240.26 |
| 6,055,321 | A * | 4/2000 | Numao et al. | G06T 1/0021 382/100 |
| 6,345,104 | B1 * | 2/2002 | Rhoads | G07D 7/0034 382/100 |
| 6,411,725 | B1 * | 6/2002 | Rhoads | G10L 19/018 382/100 |
| 7,406,214 | B2 | 7/2008 | Rhoads et al. | 382/289 |
| 8,521,217 | B2 | 8/2013 | Rodriguez | 455/550.1 |
| 9,294,754 | B2 | 3/2016 | Billerbeck et al. | H04N 13/0203 |
| 2002/0023218 | A1 | 2/2002 | Lawandy et al. | 713/176 |
| 2003/0193659 | A1 | 10/2003 | Uomori et al. | 356/3.1 |
| 2009/0251597 | A1 | 10/2009 | Suzuki et al. | 348/441 |
| 2011/0149031 | A1 | 6/2011 | Um et al. | 348/43 |
| 2011/0285825 | A1 | 11/2011 | Tian et al. | 348/47 |
| 2011/0286661 | A1 | 11/2011 | Lee et al. | 382/154 |
| 2011/0311144 | A1 | 12/2011 | Tardif | 382/195 |
| 2012/0001875 | A1 | 1/2012 | Li et al. | 345/177 |
| 2012/0140019 | A1 | 6/2012 | Jung et al. | 348/14.02 |
| 2013/0107005 | A1 | 5/2013 | Lim et al. | 348/46 |
| 2013/0242058 | A1 | 9/2013 | Bae et al. | H04N 13/0271 |
| 2013/0301906 | A1 | 11/2013 | Yoon et al. | G06T 7/0059 |
| 2014/0072205 | A1 | 3/2014 | Ishii | G06T 15/08 |
| 2015/0061509 | A1 | 3/2015 | Karlicek et al. | H05B 33/0854 |
| 2016/0063611 | A1 | 3/2016 | Davis et al. | G06Q 30/0639 |
| 2016/0094829 | A1 | 3/2016 | Georgiev et al. | H04N 13/0022 |

FOREIGN PATENT DOCUMENTS

| EP | 2963926 A1 | 1/2016 | ........... H04N 19/597 |
|---|---|---|---|
| WO | 2014015460 A1 | 1/2014 | ............. H04N 13/00 |

OTHER PUBLICATIONS

A. Cheddad, J. Condell, K. Curan and P. McKevitt, "Digital Image Steganography: Survey and Analysis of Current Methods," Signal Processing, vol. 90(3), Mar. 2010, pp. 727-752.
Anderson et al., "On the Limits of Steganography," IEEE Journal on Selected Areas in Communications, vol. 16(4), May 1998, pp. 474-481.
Johnson et al., "Exploring Steganography: Seeing the Unseen," Computing Practices, Retrieved From URL: http://www.creangel.com/papers/steganografia.pdf, Feb. 1998, 9 pages.
Seung-Chan Kim et al., "Feeling the Unseen", Apr. 27, 2013, pp. 727-732, ISBN: 978-1-4503-1952-2.
Zhenyu Wang et al., "Depth Template Based 2D-to-3D Video Conversion and Coding System," Multimedia and Expo (ICME), 2012, IEEE, Jul. 9, 2012, pp. 308-313, ISBN: 9781-4673-1659-0.

* cited by examiner

*Primary Examiner* — Andrew W Johns
(74) *Attorney, Agent, or Firm* — Athorus, PLLC

(57) ABSTRACT

Identifiers or references to supplemental information or content regarding images may be steganographically encoded into the images. The identifiers or references may be encoded into least significant bits or less significant bits of pixels within the image that may be selected on any basis. The identifiers or references may include alphanumeric characters, bar codes, symbols or other features. When an image is captured of an image having one or more identifiers or references steganographically encoded therein, the identifiers or references may be interpreted, and the supplemental information or content may be accessed and displayed on a computer display. In some embodiments, the supplemental information or content may identify and relate to a commercial product expressed in an image, and may include a link to one or more pages or functions for purchasing the commercial product.

8 Claims, 28 Drawing Sheets

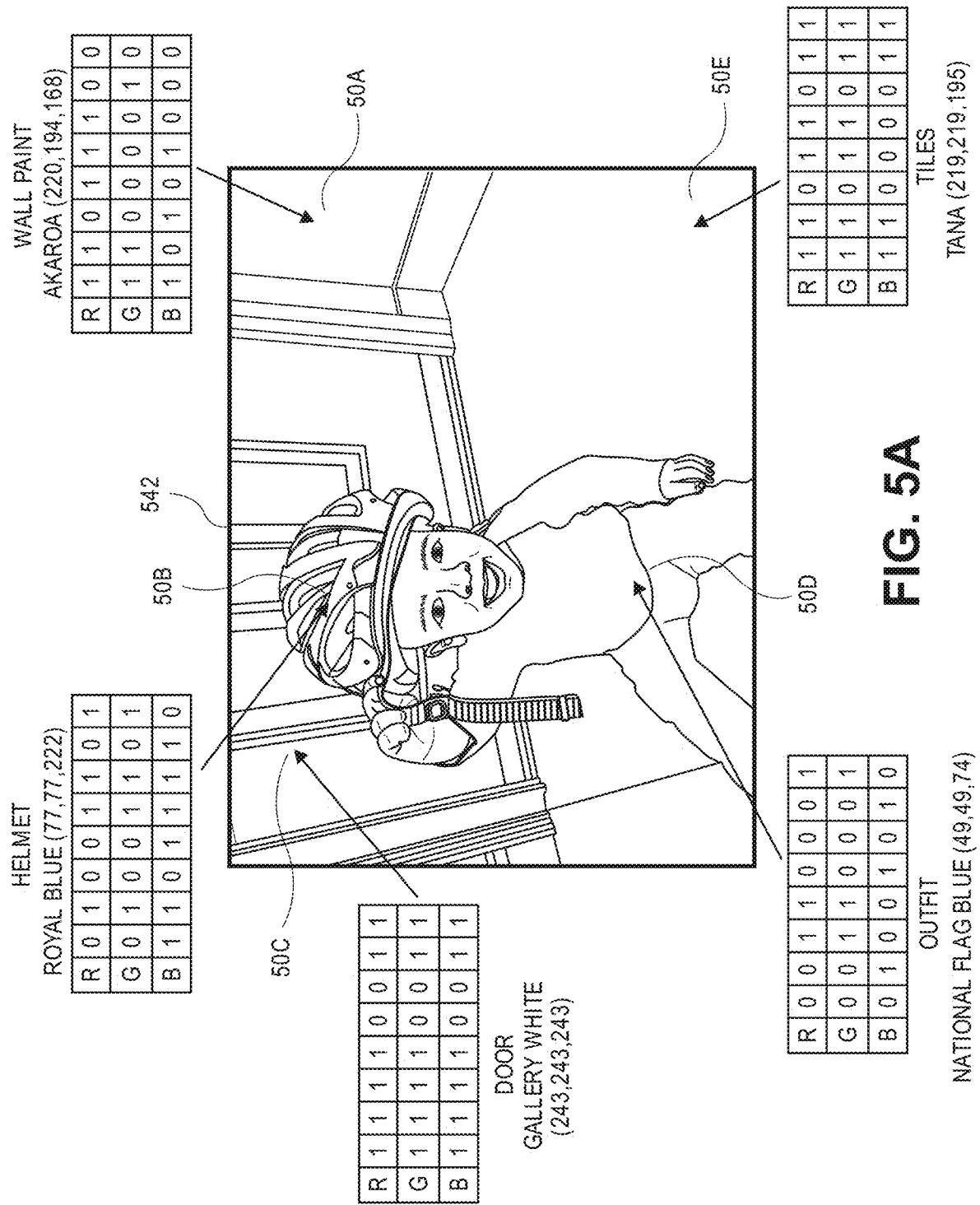

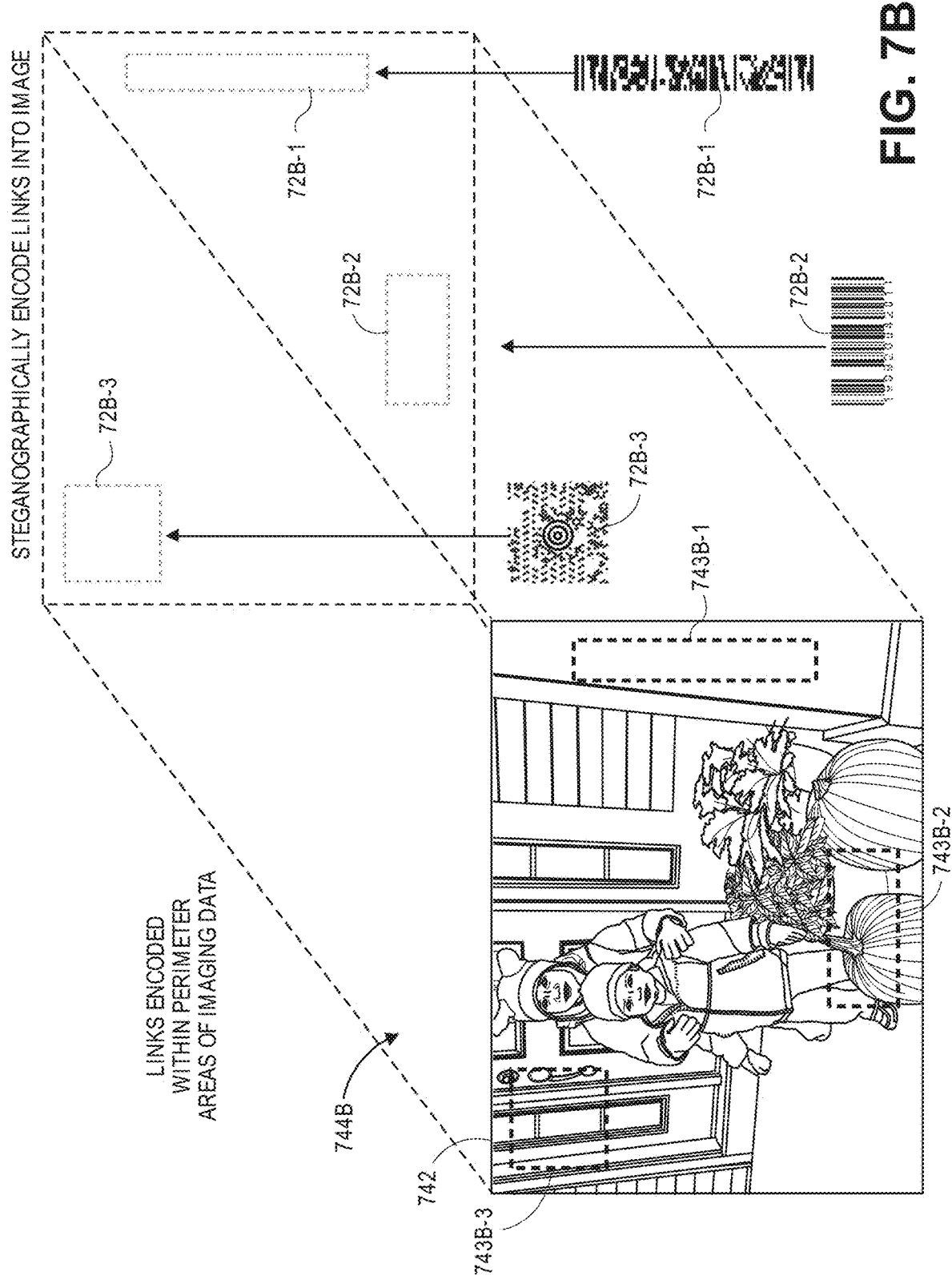

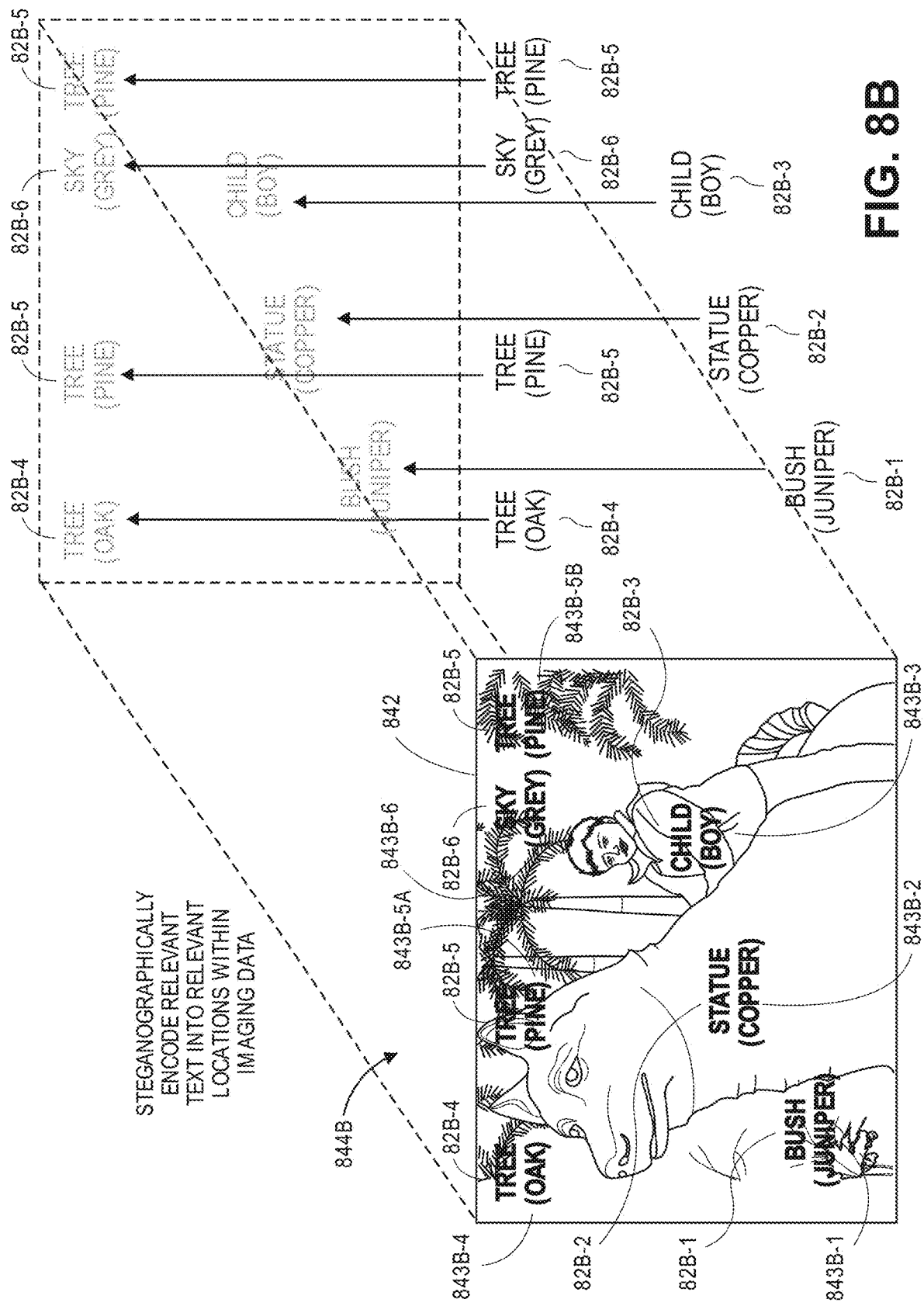

STEGANOGRAPHIC CAMERA COMMUNICATION

CROSS-REFERENCE TO RELATED APPLICATIONS

This application is a divisional of U.S. patent application Ser. No. 15/078,764, filed Mar. 23, 2016, the contents of which are incorporated by reference herein in their entirety.

BACKGROUND

A digital image is a collection of pixels, typically arranged in an array, which defines an optically formed reproduction of one or more objects, backgrounds or other features of a scene. In a digital image, each of the pixels represents or identifies a color or other light condition associated with a portion of such objects, backgrounds or features. For example, a black-and-white digital image includes a single bit for representing a light condition of the pixel in a binary fashion (e.g., either black or white), while a grayscale digital image may represent a light condition in multiple bits (e.g., two to eight bits for defining tones of gray in terms of percentages or shares of black-and-white). A color digital image may include groups of bits corresponding to each of a plurality of base colors (e.g., red, green or blue), and the groups of bits may collectively represent a color associated with the pixel. One common digital image is a twenty-four bit (24-bit) color digital image, in which each of the pixels includes three channels of eight bits each, including a first channel of eight bits for describing an extent of red within a pixel, a second channel of eight bits for describing an extent of green within the pixel, and a third channel of eight bits for describing an extent of blue within the pixel.

Steganography is the art and science of sending and receiving communications in a manner that prevents their presence from being detected. The word "steganography," which literally means "covered writing" in Greek, is commonly used to describe communications techniques in which invisible or subliminal messages are hidden within digital images. A steganographic process starts by selecting content that is to be concealed, and by identifying portions of a base image, e.g., an image having one or more bits that may be modified to encode the content without damaging the integrity or size of the base image. Such bits, which are sometimes referred to as "least significant bits," "less significant bits," or "redundant bits," may be co-opted and replaced with data corresponding to the content to be concealed. By its very nature, steganographic conversion and storage of data within a base image necessarily reduces the clarity and resolution of the base image, to at least a very limited extent. Where the bits of the base image are properly selected, however, information or data may be concealed within a base image in a manner that is indiscernible to the human eye, and which neither increases nor decreases a total number of bits occupied by the modified base image, thereby ensuring that a size of a file including the modified base image is no larger than a size of the base image itself.

BRIEF DESCRIPTION OF THE DRAWINGS

FIGS. 5A through 5D are views of aspects of one system or process for steganographic camera communication in accordance with embodiments of the present disclosure.

FIGS. 7A through 7D are views of aspects of one system or process for steganographic camera communication in accordance with embodiments of the present disclosure.

FIGS. 8A and 8B are views of aspects of one system or process for steganographic camera communication in accordance with embodiments of the present disclosure.

DETAILED DESCRIPTION

Figure 1A:
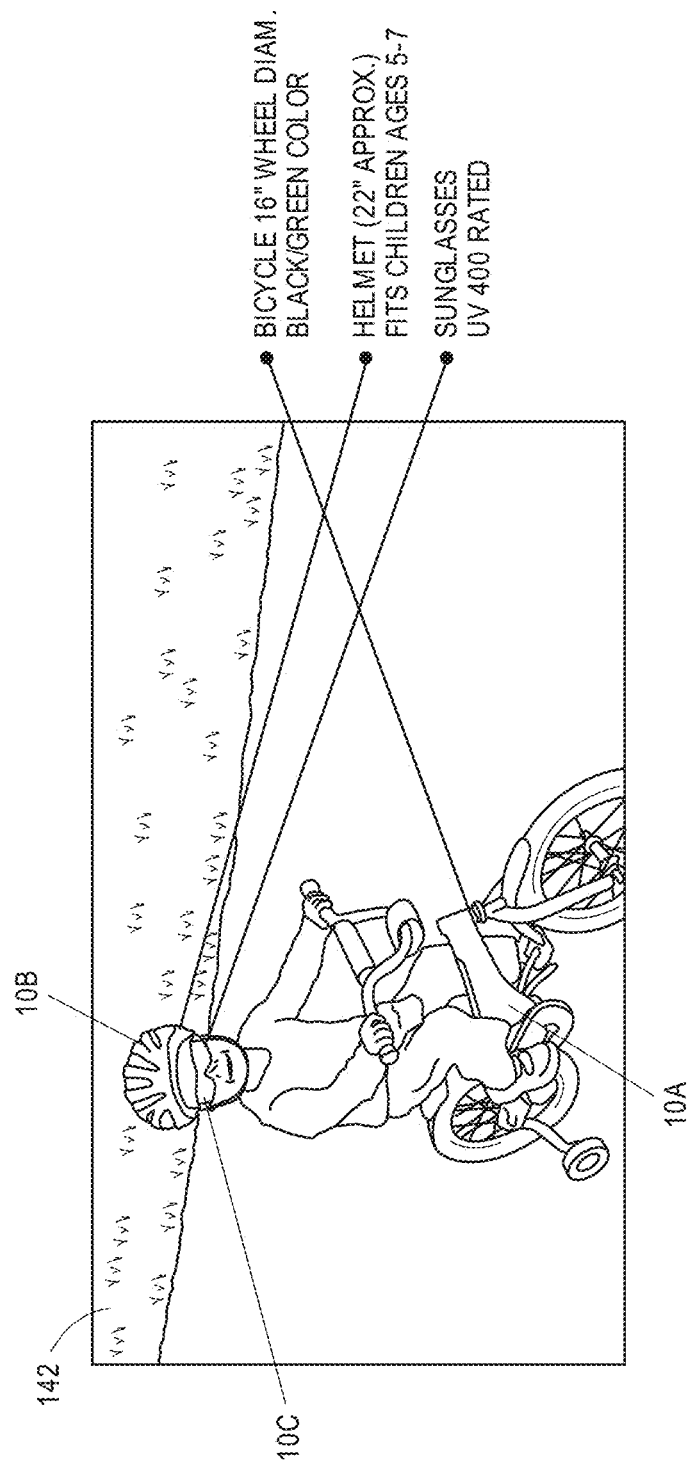
FIGS. 1A through 1D are views of aspects of one system or process for steganographic camera communication in accordance with embodiments of the present disclosure.

As is set forth in greater detail below, the present disclosure is directed to systems and methods for steganographic communication using cameras. More specifically, the systems and methods of the present disclosure are directed to steganographically incorporating information or data corresponding to objects, backgrounds or other features of a visual image (e.g., a digital image including color, grayscale or black-and-white pixels, or a hard copy of such an image) into one or more representative pixels of the visual image. The representative pixels may be modified by supplanting data stored in least significant bits or less significant bits thereof (e.g., lowest-valued bits of a grayscale pixel, or lowest-valued bits of one or more channels of a color pixel) to generate a visual identifier associated with any supplemental content that may relate to the visual image, e.g., to a scene represented in the visual image, or to one or more objects that are shown, expressed or otherwise visible within the scene. The systems and methods of the present disclosure may thus effectively co-opt one or more bits of data indicative of a color of a representative pixel of a visual image in order to store bits of additional data indicative or descriptive of content shown within the image, or of identifiers of (e.g., links to) indicators or descriptors of such content. The representative pixels and the bits thereof in which supplemental content is to be stored may be selected on any basis, including but not limited to their respective locations within the visual image, or values or attributes of the color of the pixels, or at random.

In some embodiments of the present disclosure, a visual image may be steganographically encoded with one or more visual identifiers that are representative of the visual image or one or more of the contents therein. The visual identifiers may include bar codes, alphanumeric characters (e.g., text, numbers and/or symbols) or any other type or form of symbol or other identifier that may be associated with supplemental content of any type or form regarding the content of the visual image. The visual identifiers are steganographically encoded into one or more visual images in a manner that renders such identifiers invisible to the human eye, but sufficiently detectable to imaging devices and associated computer-implemented modules and computer components, thereby enabling users of such imaging devices to request and receive supplemental content while viewing the visual images, which may be still or moving, and printed or rendered in any digital format.

Thus, a first image may be used to communicate additional information regarding visual content expressed within the first image upon a request of a user of an imaging device, e.g., by capturing a second image of the first image within a field of view of the imaging device, and interpreting the second image to recognize the additional information stored therein. The additional information may be used to identify or elaborate upon the contents of the first image, or to provide one or more links to external resources having further information regarding such contents. For example, where a digital image depicts a commercial product, the digital image may be steganographically encoded to include text-based information regarding the commercial product, such as a name, a manufacturer, a size, a style or a price of the commercial product, or to include one or more hyperlinks to (or identifiers of) external network pages having further details regarding the commercial product, or which offer opportunities for a customer to electronically execute a purchase of the commercial product.

Referring to FIG. 1A through 1D, views of aspects of a system or process for steganographic camera communication in accordance with embodiments of the present disclosure are shown. As is shown in FIG. 1A, digital imaging data 142 features a scene and a plurality of objects, including a bicycle 10A and one or more accessories for the bicycle 10A, such as a helmet 10B and a pair of sunglasses 10C. The imaging data 142 may be a still image, or one or more frames of moving images, e.g., a video file or other set of multimedia data.

Figure 1B:
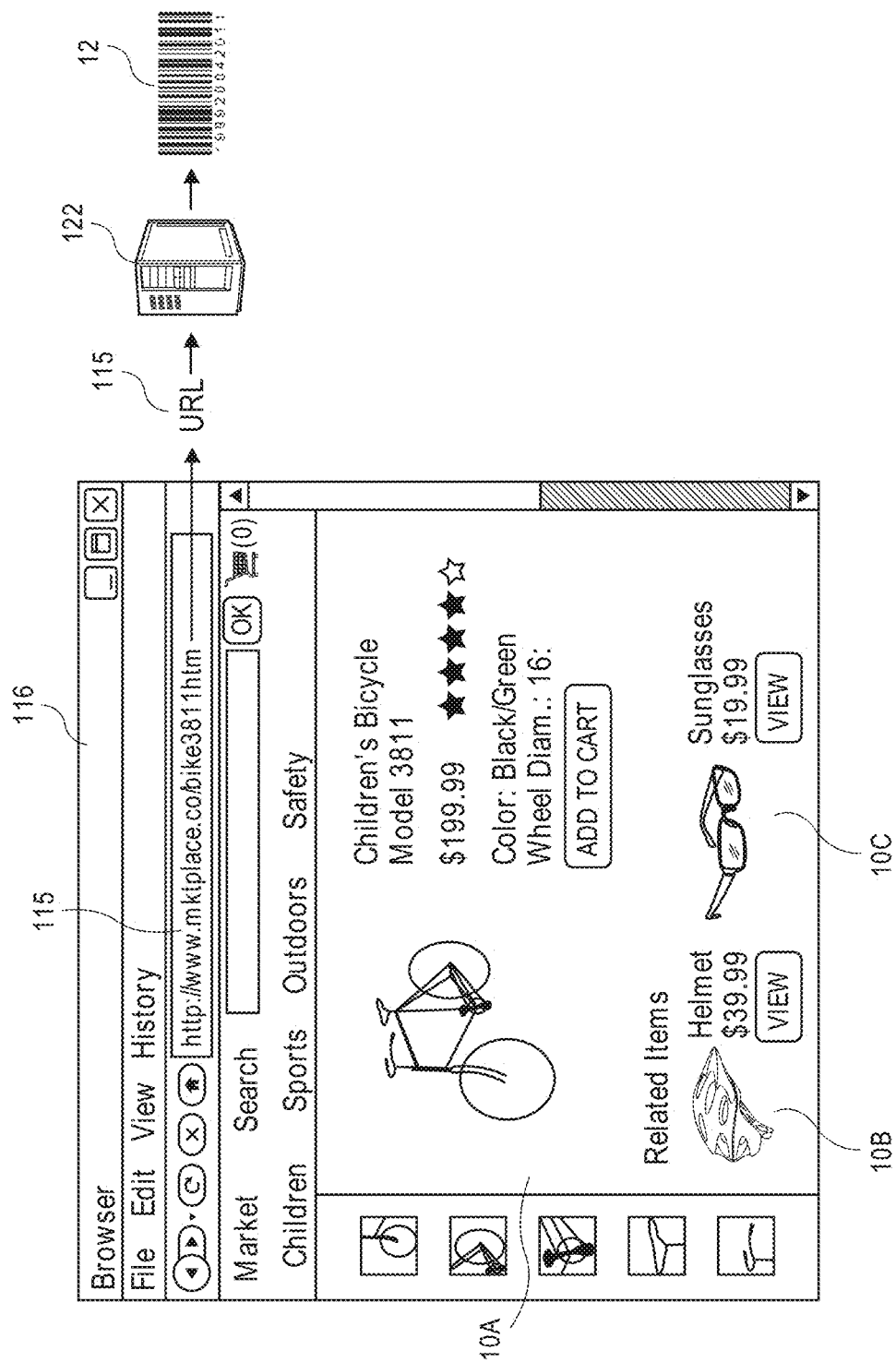

The bicycle 10A, the helmet 10B and the pair of sunglasses 10C may be commercially available for purchase, such as through an online marketplace or a traditional brick-and-mortar retailer. For example, as is shown in FIG. 1B, a network page 116 offering the bicycle 10A for sale at an online marketplace may include a variety of information or data regarding the bicycle 10A, e.g., details, dimensions, ratings, costs or images of the bicycle 10A, and one or more interactive features by which a customer may add the bicycle 10A to a virtual shopping cart or otherwise purchase the bicycle 10A. The network page 116 may further include information or data regarding one or more items that are related to the bicycle 10A, such as the helmet 10B or the pair of sunglasses 10C. Traditionally, in order to access the network page 116 regarding the bicycle 10A, a customer is required to access an interactive application such as a browser via one or more computer devices, and either enter a uniform resource locator (or URL) 115 into an address bar or other space provided by the browser, search for the bicycle 10A using one or more keywords, or browse through one or more categories until he or she finds information corresponding to the bicycle 10A.

Figure 1C:
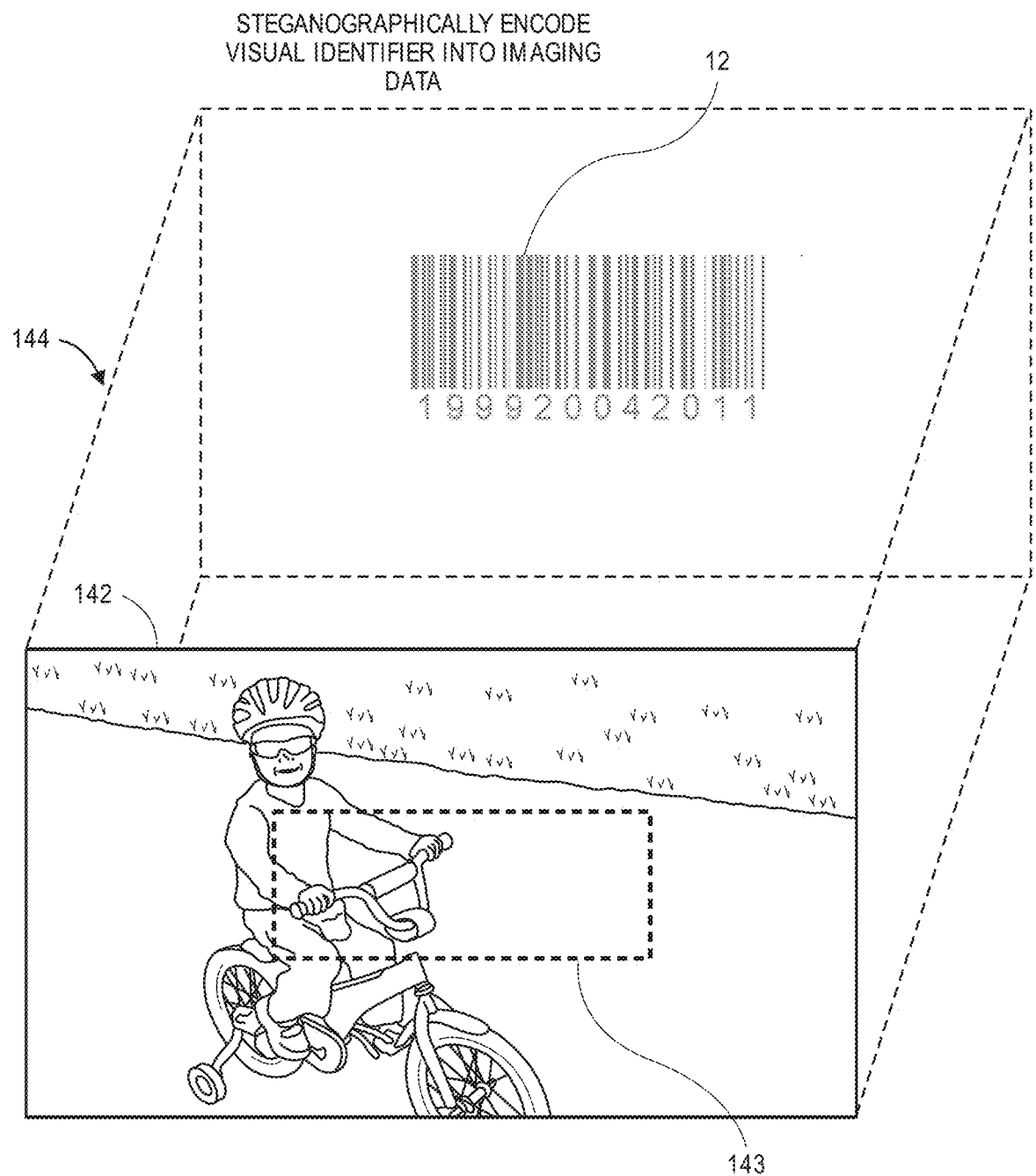

As is discussed above, in accordance with the present disclosure, visual identifiers such as one or more references to external content may be steganographically encoded into visual imagery, in a manner that renders such identifiers invisible to the human eye, but readily detectable by one or more imaging devices and image processing techniques. For example, referring again to FIG. 1B, the URL 115 for the network page 116 may be converted to a bar code 12 or other optically readable identifier, e.g., by one or more computer devices 122 associated with the marketplace. As is shown in FIG. 1C, the bar code 12 may then be encoded into a selected portion 143 of the image 142, such as by modifying least significant bits or less significant bits of a pattern of pixels in a central location of the image 142. For example, the alternating pattern of light and dark lines embodied in the bar code 12 may be transmuted into corresponding least significant bits or less significant bits in a portion of the image 142, i.e., by imperceptibly darkening areas within the selected portion 143 of the image 142 corresponding to the darkened bars of the bar code 12 and/or lightening intervening spaces of the image 142 between the darkened bars of the bar code 12, resulting in a modified image 144 that may be stored in one or more data stores and reproduced or displayed on demand. Thus, whereas a human eye could not detect the presence of the bar code 12 within the modified image 144, an imaging device that is configured to capture and process imaging data may readily determine not only that the bar code 12 is present therein but also interpret the bar code 12 and access information associated therewith, e.g., information to which the bar code 12 is linked, such as one or more of the details provided on the network page 116.

Figure 1D:
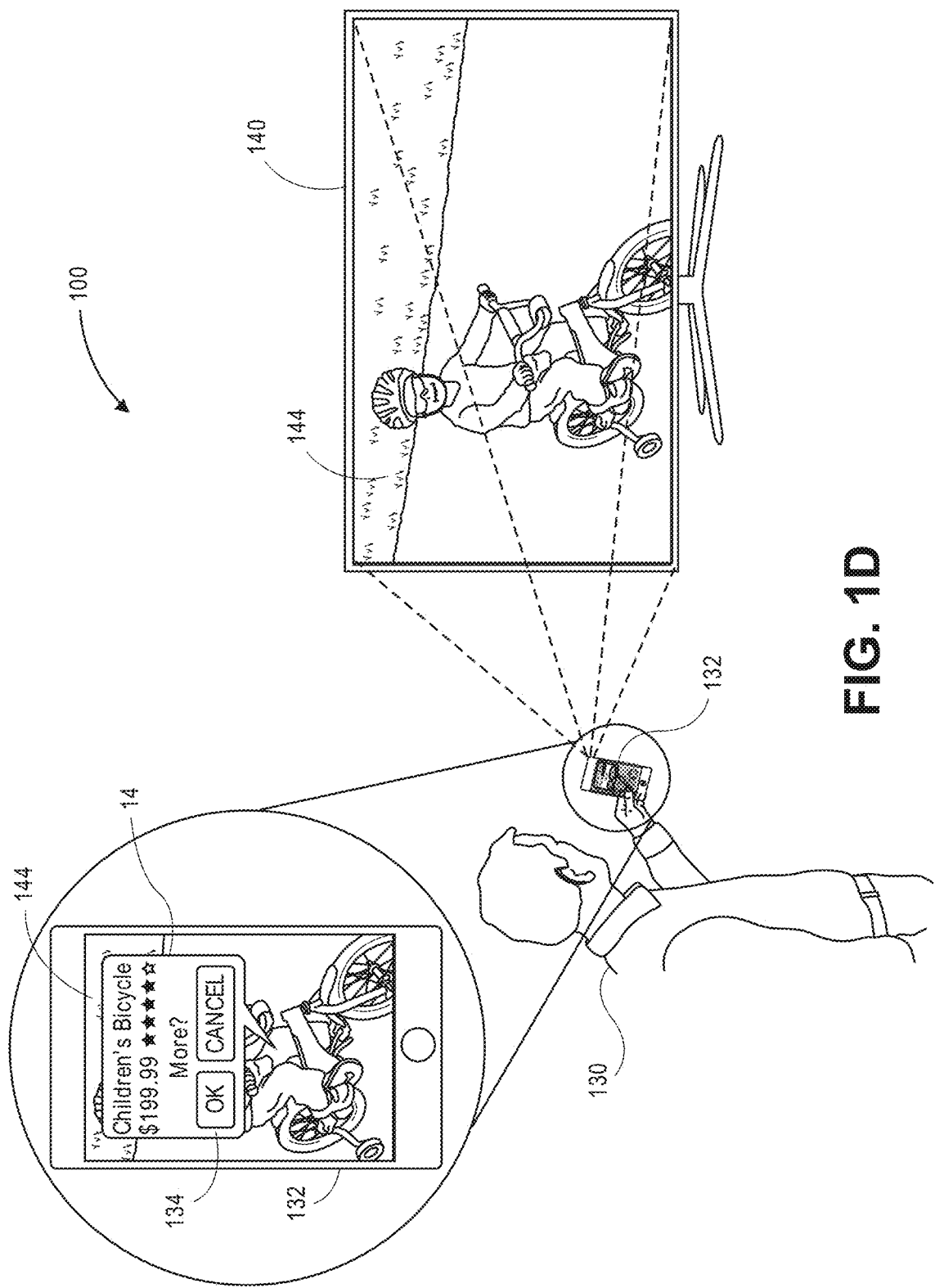

As is shown in FIG. 1D, a user 130 of a smartphone 132 having one or more imaging devices therein is viewing still or moving images on a television 140 or other display device. The modified image 144 is rendered on the television 140. The user 130 may align the smartphone 132 in a manner that places all or a portion of the television 140 and the modified image 144 rendered thereon within a field of view of a resident imaging device, and causes the smartphone 132 to capture some or all of the modified image 144 and the bar code 12 (not shown in FIG. 1D) within the field of view. Upon recognizing the bar code 12, the smartphone 132 may access any supplemental content associated with the bar code 12 and the URL 115, including but not limited to content displayed on the network page 116 of FIG. 1B, or a modified version of the network page 116, in a window 14 rendered above the modified image 144 on a user interface 134. As is shown in FIG. 1D, the user 130 may request additional information regarding the modified image 144, or the bicycle 10A represented therein, or may close the window 14 and resume viewing the modified image 144 or take any other action that may be relevant or desired using the smartphone 132.

Accordingly, the systems and methods of the present disclosure may steganographically encode visual identifiers into images of any type or form, including but not limited to still images, moving images, print images, portraits or the like. Because a steganographic process may encode visual identifiers into images in a manner that enables the visual identifiers to remain unnoticed by humans, but to be detected and interpreted by computer devices, and without substantially affecting the content of such images, the images themselves may act as unobtrusive and optional gateways to additional information or content relating to the content expressed in such images. Where a viewer of one of an image having a visual identifier steganographically encoded therein intends to view additional information or content regarding the image, the viewer may capture an image of the image, e.g., using a computer device equipped with a camera or other imaging device, such as a smartphone or tablet computer. Once the identifier is recognized and interpreted, an external resource associated with the identifier may be accessed and downloaded to the computer device, and displayed concurrently with the captured image of the image, or as a replacement for the captured image of the image, on a display of the computer device, e.g., on a touchscreen of the smartphone or tablet computer. Where a viewer has no interest in the additional information or content, however, the user need not take any action at all, and may instead continue with his or her viewing of the image.

Imaging data in the form of visual imaging data, or depth imaging data, may be captured using one or more imaging devices such as digital cameras, depth sensors or range cameras. Such devices may generally operate by capturing light that is reflected from objects, and by subsequently calculating or assigning one or more quantitative values to aspects of the reflected light, e.g., pixels, generating an output based on such values, and storing such values in one or more data stores. Digital cameras may include one or more sensors having one or more filters associated therewith, and such sensors may detect information regarding aspects of any number of pixels of the reflected light corresponding to one or more base colors (e.g., red, green or blue) of the reflected light, or distances to objects from which the light was reflected. Such sensors may generate data files including such information, and store such data files in one or more onboard or accessible data stores (e.g., a hard drive or other like component), as well as one or more removable data stores (e.g., flash memory devices), or displayed on one or more broadcast or closed-circuit television networks, or over a computer network as the Internet.

Imaging data files that are stored in one or more data stores may be printed onto paper or other alternatives, presented on one or more computer displays, or subjected to one or more analyses, such as to identify items expressed therein. Such data files may be stored in any number of formats, including but not limited to JPEG or JPG files, or Graphics Interchange Format (or ".GIF"), Bitmap (or ".BMP"), Portable Network Graphics (or ".PNG"), Tagged Image File Format (or ".TIFF") files, Audio Video Interleave (or ".AVI"), QuickTime (or ".MOV"), Moving Picture Experts Group (or ".MPG," ".MPEG" or ".MP4") or Windows Media Video (or ".WMV") files.

Reflected light may be captured or detected by an imaging device if the reflected light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include manual or automatic features for modifying their respective positions, fields of view or orientations. For example, a digital camera may be configured in a fixed position, or with a fixed focal length (e.g., fixed-focus lenses) or angular orientation. Alternatively, an imaging device may include one or more actuated or motorized features for adjusting a position of the imaging device, or for adjusting either the focal length (e.g., zooming the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation.

For example, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting a position, axis or direction of the device, i.e., by moving, panning or tilting the device. Panning an imaging device may cause a rotation within a horizontal plane or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Some modern imaging devices may digitally or electronically adjust an image identified in a field of view, subject to one or more physical and operational constraints. For example, a digital camera may virtually stretch or condense the pixels of an image in order to focus or broaden the field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures or outlines of the features or objects, may be extracted from the data in any number of ways. For example, colors of pixels, or of groups of pixels, in a digital image may be determined and quantified according to one or more standards, e.g., the RGB ("red-green-blue") color model, in which the portions of red, green or blue in a pixel are expressed in three corresponding numbers ranging from 0 to 255 in value, or a hexadecimal model, in which a color of a pixel is expressed in a six-character code, wherein each of the characters may have a range of sixteen. Colors may also be expressed according to a six-character hexadecimal model, or # NNNNNN, where each of the characters N has a range of sixteen digits (i.e., the numbers 0 through 9 and letters A through F). The first two characters NN of the hexadecimal model refer to the portion of red contained in the color, while the second two characters NN refer to the portion of green contained in the color, and the third two characters NN refer to the portion of blue contained in the color. For example, the colors white and black are expressed according to the hexadecimal model as # FFFFFF and #000000, respectively, while the color candy apple red is expressed as # D61123. Any means or model for quantifying a color or color schema within an image or photograph may be utilized in accordance with the present disclosure. Moreover, textures or features of objects expressed in a digital image may be identified using one or more computer-based methods, such as by identifying changes in intensities within regions or sectors of the image, or by defining areas of an image corresponding to specific surfaces.

Edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

Steganography is typically defined as the art, or the science, of embedding or concealing information or data within other information or data. In a computer-based context, steganographic techniques are commonly utilized to embed one or more bits of data, or streams of such bits, into one or more other bits of data, or one or more other streams of such bits. For example, information or data is commonly steganographically encoded into imaging data, e.g., files including one or more still or moving images, without altering the information or data being encoded, and without substantially altering the imaging data to an appreciable degree.

To date, steganography has been extensively and nearly exclusively used for encrypting hidden information or metadata into digital files, such as images. For example, fraudsters, spammers or hackers are known to steganographically inject executable files into seemingly harmless images, and to send one or more of the steganographically altered images via electronic mail or other messaging techniques to a computer device of an unsuspecting recipient. Steganography is also believed to have been used in a number of military and law enforcement applications, as well.

According to some steganographic techniques, information or data may be encoded into one or more least significant bits or bytes of an image (or less significant bits or bytes of the image). For example, in a 24-bit digital image with pixels having three eight-bit channels (e.g., a red channel, a green channel and a blue channel), the available capacity for storing information in each pixel is substantial. Because each of the three eight-bit channels in a pixel may have two hundred fifty-six (i.e., two to the eighth power, $2^8$) unique values, each pixel of a three-channel 24-bit digital image may represent one of 16,777,216 (e.g., two to the eighth power cubed, $(2^8)^3$; or two hundred fifty-six cubed, $256^3$) unique colors. Therefore, some steganographic techniques operate by identifying one or more least significant bits or bytes, or less significant bits or bytes, in one or more of the channels of a pixel, and replacing one or more of such least significant bits or bytes with information or data, without causing any significant degradation of the clarity or resolution of the image.

For example, by storing information or data within a single least significant bit of each of three color channels in a pixel, the number of unique colors that may be represented in the pixel is reduced to 2,097,152 (e.g., by one-eighth). In an image of substantially high resolution, the reduction in the number of available colors that may be represented using the remaining seven bits of each of the three channels of the pixel is typically indiscernible to the human eye. However, such a reduction provides three bits for storing additional information or data within each of the pixels of the 24-bit digital image. In a standard 3.1 megapixel (MP) digital image having dimensions of 2048×1536 pixels, nearly nine-and-one-half million bits, or 1.2 megabytes (MB) of storage may be so provided.

Similarly, steganographically storing information or data within two least significant bits of each of the three color channels in a 24-bit digital image pixel reduces the maximum number of unique colors that may be represented in such pixels to 262,144 (e.g., by one-sixty-fourth, or two to the negative sixth power, $2^{-6}$), which is also likely indiscernible to the human eye, and yet may create up to an additional 2.4 megabytes (MB) of storage capacity within a standard 3.1 megapixel digital image, without typically increasing a size of the file. Likewise, steganographically storing information or data within three least significant bits of each of the three color channels in a 24-bit digital image pixel reduces the number of unique colors that may be represented in such pixels to 32,768 (e.g., by one-five-hundred-twelfth, or two to the negative ninth power, $2^{-9}$), which is also likely indiscernible to the human eye, but may create up to an additional 3.5 megabytes (MB) of storage capacity within a standard 3.1 megapixel digital image, without typically increasing a size of the file.

Thus, steganography and steganographic techniques may require an image to sacrifice clarity or resolution (e.g., color quality in visual imaging data, or depth precision in depth imaging data), but may, in exchange for this sacrifice, provide an internal storage means within the image to store one or more bits of information or data. Where the number of bits of information or data to be encoded into an image is small, or may be spread out across the image, the loss in clarity or resolution resulting from this sacrifice is insubstantial and may go unnoticed by humans.

The systems and methods of the present disclosure are directed to utilizing steganographic techniques to encode visual identifiers, or links, into visual imaging data (e.g., color imaging data, well as black-and-white or grayscale imaging data). The identifiers or links may be associated with any type or form of external content, e.g., text-based information, audio signals, video signals or other information or data. Thus, once an imaging device captures one or more images of an image that has been steganographically encoded with one or more visual identifiers or links to external content, such as the modified image 144 shown in FIG. 1D, the identifiers or links may be recognized and interpreted, and used to access the external content. A user may operate any type of imaging device provided in association with a computing device in order to capture imaging data regarding steganographically encoded images. For example, such imaging data may be captured using any type or form of imaging device such as a red, green, blue ("RGB") color camera, a still camera, a motion capture/ video camera, as well as imaging devices or other devices that are configured to capture depth information or data, including depth-sensing cameras such as RGBz (or RGBD) cameras. In some other implementations, one or more of the cameras may be a thermographic or infrared (IR) camera.

A visual identifier may be steganographically encoded into a visual image in any manner that enables the identifier to remain undetected by the human eye yet enhances the visibility of the identifier to imaging devices or other optical machines. Human eyes and their visual axes may be forcibly repositioned by large-scale movements of the head or neck, or by smaller movements of the eyes, known as saccades or saccadic eye movements, which redirect a fovea of a retina from one point of interest to another. By some estimates, saccades occur in most humans three to four times per second. Thus, whereas a human eye may provide a visual field of view of approximately two hundred degrees (200°), the human eye typically captures intensely detailed information from a fovea in the form of a slender band having a width of a handful of degrees. The fovea includes tens of thousands of photoreceptors that change their position every two hundred to three hundred milliseconds. In contrast, an imaging device may capture imaging data for each of a plurality of image pixels within an entire field of view upon a shuttering, with the field of view being defined by the properties of a lens and not by any involuntary narrowing thereof, as with a fovea. Thus, the image pixels of the entire field of view may be processed, e.g., by one or more computer processors, to recognize any color variations or shading variations expressed therein, to determine whether such color variations or shading variations are consistent with one or more visual identifiers, and to interpret such visual identifiers and/or to identify any relevant supplemental information associated with such identifiers.

The systems and methods for steganographic communication disclosed herein may be further enhanced by physical or virtual phenomena that are present when a first set of a second set of imaging data (e.g., one or more still or moving images) is captured by an imaging device with other imaging data (e.g., one or more other still or moving images) rendered within a field of view of the imaging device. Where a digital camera is aligned to capture still or moving images of a video display device having still or moving images rendered thereon, differences between a frame rate of the digital camera and a refresh rate of the video display device may cause one or more patterns of interference, sometimes called Moiré patterns, to visibly alter the manner in which the rendered still or moving images appear within the captured still or moving images. Such interference effects may accentuate a presence of a visual identifier within a captured image of a displayed image, thereby increasing a likelihood that the visual identifier will be recognized and interpreted by an imaging device and one or more associated computer processors. Moreover, similar effects may be observed where the imaging device that is aligned to capture imaging data from a displayed image, and the displayed image itself, are also in relative motion.

The systems and methods of the present disclosure permit imaging systems or methods to capture one or more images of other images and to rapidly determine information pertaining to contents of such other images based not on a direct analysis of such contents but by interpreting visual identifiers that are steganographically encoded therein, yet are invisible to the human eye. Accordingly, such systems and methods may recognize and interpret information regarding such contents more rapidly and efficiently than traditional imaging systems or methods, and in ways that such imaging systems or methods cannot emulate. For example, where an image depicts a man drinking a clear beverage or wearing a wool suit, at best, traditional imaging systems or methods may be able to determine that the image includes an outline of a man, or that the man is holding a glass, e.g., using one or more edge detection or color or texture analysis techniques. Even if such systems or methods are able to recognize the man or the glass, however, no such system or method may determine whether the clear beverage is water, vinegar, soda or medicine, let alone whether the water is tap water or spring water, whether the vinegar or the soda are of a particular type or brand, or whether the medicine is of a specific strength or concentration. Likewise, such systems are unable to determine a material, a brand, a size, a style or a manufacturer of the suit, or locations or identities of merchants or vendors from which the suit may be purchased. The systems and methods of the present disclosure enable supplemental content regarding images, or links to supplemental content, to be steganographically encoded within such images, and enable viewers of such images to access the supplemental content at their own discretion.

In accordance with the present disclosure, visual identifiers that are steganographically encoded into imaging data may be of any type or form, and may have any dimension. For example, one steganographically encoded visual identifier may be a bar code (e.g., a one-dimensional or two-dimensional bar code, such as a QR code) that may be specifically encoded to embody or represent supplemental information or content, or a link to supplemental information or content. Another steganographically encoded visual identifier may be a set of alphanumeric characters, including one or more letters or numbers. For example, visual imaging data may be steganographically encoded with text including the supplemental information or content itself, which may be recognized in one or more images captured from the imaging data. Furthermore, the alphanumeric characters may embody one or more URLs associated with an external resource, e.g., a network page or other set of networked data, and such characters may be recognized and used to access the external resource. Yet another steganographically encoded visual identifier may be a polygon or other shape or symbol. Any type of information or data that may be encoded into a digital image by creating a contrast between and among pixels that may be discerned by an imaging device having one or more computer processors, but remains substantially invisible to the human eye, may act as a visual identifier in accordance with the present disclosure.

Those of ordinary skill in the pertinent arts will recognize that visual identifiers may be steganographically encoded into visual imaging data at any time after the imaging data has been captured, e.g., immediately after the imaging data has been captured, or at any other date or time, and by anyone in possession or control of the imaging data and/or the content therein. For example, one or more visual identifiers may be encoded into imaging data in real time or in near-real time, e.g., into one or more frames of moving images captured in a "live" format, or at any subsequent time. Alternatively, the one or more visual identifiers may be encoded into a still image, also in real time or in near-real time, or at any subsequent time. Moreover, once one or more visual identifiers have been encoded into imaging data, the modified imaging data may be made available to one or more potential viewers immediately, such as by presenting the modified imaging data on one or more displays, e.g., in still or moving form, or by printing the imaging data on paper or other media. Thereafter, one or more imaging devices (e.g., a mobile device such as a smartphone or tablet computer) may capture an image of the modified imaging data, and the one or more visual identifiers encoded therein may be recognized and interpreted in order to cause supplemental information or content relating to the modified imaging data to be rendered thereby. Additionally, representative pixels of imaging data may be modified to encode a visual identifier therein, and modified again to remove the visual identifier therefrom, thereby restoring the imaging data to a virgin state. Subsequently, the imaging data may be modified again to encode a new visual identifier therein. The process of encoding visual identifiers into imaging data and removing the visual identifiers therefrom may be repeated as many times as is necessary or desired.

A visual identifier such as a bar code or a set of alphanumeric characters may be steganographically encoded into visual imaging data by selecting a location within one or more images or frames of the visual imaging data that may accommodate the visual identifier, and defining a pattern of pixels that must be steganographically altered in order to create a visual contrast that may be recognized by an imaging device and one or more computers, but not by the human eye. Some visual identifiers may include one-dimensional bar codes, two-dimensional bar codes, bokodes or any other form of coded representations of information or data. Some common one-dimensional bar codes include Code 39 codes, Extended Code 39 codes, Code 128 Codes, UCC/European Article Numbering (or "EAN") 128 codes, Universal Product Code (or "UPC") A or E codes, EAN13 or EAN8 codes, Interleaved (or "ITF") codes, CodaBar codes, Code 11 codes, Code 93 codes, GS1 DataBar codes, GS1 DataBar Expanded codes, GS1 DataBar Limited codes, GS1 DataBar Coupon codes, DataBar Omni-Directional Stacked or Truncated codes, MSI Plessey codes, POSTNET codes, PLANET codes or OneCode codes. Some common two-dimensional bar codes include PDF417 codes, Data Matrix codes, MaxiCode codes, Aztec codes or QR codes. Additionally, some visual identifiers may also include other alphanumeric characters or symbols.

In some embodiments, where a visual identifier to be encoded into visual imaging data includes a bar code having a pattern of alternating light and dark sections, a section of one or more frames of the visual imaging data that is sufficiently sized to accommodate the pattern may be selected, and regions of pixels may be steganographically altered to create an appropriate level of contrast between them. For example, where a digital image includes a section of high-resolution blaze orange having red, green and blue color values of (246, 103, 51) in decimal, one or more portions of the digital image corresponding to dark bars or sections of a bar code may be modified by converting values of less significant bits to create a slightly darker orange, while one or more other portions of the digital image corresponding to light bars or sections of the bar code may be modified by converting values of the less significant bits to create a slightly lighter orange. By selectively altering pixels within adjacent sections of a digital image, a visual identifier comprised of a bar code having different colors in contrast that are imperceptible to humans but may be readily discerned by imaging devices may be embedded into the digital image thereby.

For example, whereas the red color value of the blaze orange is 246 in decimal, or 11110110 in binary, the red color value may be varied simply by changing one or more of the final three binary digits of the red color value (e.g., by increasing or decreasing the digits) to within a range of 11110000 to 11110111, which corresponds to red color values of 240 to 248 in decimal. Similarly, the green and blue color values of 103 and 51 in decimal, or 01100111 and 00110011 in binary, respectively, of the blaze orange may be varied simply by changing one or more of the final three binary digits of the respective color values to within ranges of 01100000 to 01100111 in binary, or 96 to 103 in decimal, for the green color value and ranges of 00110000 to 00110111 in binary, or 48 to 55 in decimal, for the blue color value, respectively. Thus, the visual identifier may be expressed in the section of the orange by contrast between a first variant of orange and a second variant orange within a section of blaze orange such that the visual identifier is imperceptible to human viewers, but may be readily discerned by one or more imaging devices having computer processors associated therewith. The synthesis of visual contrast within a digital image by steganographic modification of least significant bits or less significant bits may be used to encode any type of visual identifier within the digital image, including not only bar codes but any type or form of alphanumeric characters, symbols or other markings or indicia.

A visual identifier may be steganographically encoded into any relevant or appropriate portion of an image (e.g., a spatial location within the image). According to some embodiments of the present disclosure, representative pixels for encoding the visual identifier may be centrally located within an image frame, e.g., generally across all or a portion of the image frame. In some other embodiments, however, the representative pixels may be located in a standard location within an image frame (e.g., a perimeter of the frame, a designated corner of the frame, or any other section of the frame), and an imaging device that captures one or more images of the frame may be configured to recognize that the image includes an outline of an image, and to search the standard location within the outline of the image for one or more visual identifiers.

In addition to spatial variations, visual indicators may also be varied temporally within imaging data. For example, as is discussed above, a bar code, a set of alphanumeric characters or one or more other identifiers may be placed in any location within a visual image. Likewise, different visual images may be encoded into discrete frames of imaging data, e.g., portions of a video file, and configured to appear at different times when the imaging data is played. In some embodiments, a series of video frames including a plurality of objects within a scene may be encoded to include visual identifiers corresponding to the scene and/or one or more of the objects simultaneously, or at different times, as the video frames are played on a display device. For example, a first visual identifier associated with general information descriptive of the scene may be displayed at the outset, e.g., as an introduction, and subsequent visual identifiers may be displayed at later times, such as when specific objects enter the scene or are featured prominently.

Moreover, in order to facilitate a search for one or more visual identifiers within a visual image, a selected visual identifier indicating whether the visual image includes one or more other visual identifiers, or where such identifiers are located within the visual image, may be encoded therein, e.g., within a predetermined location in the visual image. The selected visual identifier may be a "telltale indicator" of the presence or absence of other visual identifiers of additional information, or locations of the additional information, and need not itself link to or be associated with any additional information. Thus, when an image of the visual image is captured, only the predetermined location need be searched for visual identifiers. If a telltale indicator is found therein, the telltale indicator may be interpreted to determine whether the visual image includes one or more other visual identifiers, or where such identifiers may be located. For example, the selected visual identifier or telltale indicator may be a symbol, a character, an icon or any other feature, or one or more of such features, which may be steganographically encoded into a visual image.

According to some embodiments of the present disclosure, representative pixels for encoding one or more visual identifiers into a digital image may be selected according to methods or techniques that systematically evaluate pixels within the visual imaging data (e.g., color, grayscale or black-and-white pixels) and identifies and selects representative pixels for storing steganographically encoded visual identifiers therein. For example, the representative pixels may be identified at random, or in specific locations within visual imaging data (e.g., predefined locations within the images, such as in a grid or according to a pattern, or based on a rectangular or polar coordinate system centered or based in one or more specific locations of the imaging data). Such methods or techniques may identify one or more homogenous sets or subsets of representative pixel regions or sectors (e.g., grids or groupings of pixels) of visual imaging data, one or more of which may be ultimately selected for encoding with pixels corresponding to a visual identifier.

In some other embodiments of the present disclosure, representative pixels may be identified in locations that may be selected based on attributes of the visual imaging data. For example, representative pixels may be identified or defined within visual imaging data as a function of variations of pixel-level intensities within the visual imaging data, which may be quantitatively determined by recognizing various texture properties within the visual imaging data, comparing numerical measures of the relative intensities of pixels or textons within the visual imaging data to one another, or on any other basis. Representative pixels may be selected based on one or more repetitive patterns observed within visual imaging data, i.e., locations within the imaging data where the properties of the imaging data are constant, varying slowly, or substantially periodic in nature, and may be recognized using one or more algorithms or machine-learning tools. Any means or model for selecting representative pixels from a set of visual imaging data (e.g., a still or moving black or white, grayscale, color or depth image captured from a scene) for steganographically encoding visual identifiers therein may be utilized in accordance with the present disclosure.

Once representative pixels have been identified and/or selected for steganographically encoding a visual identifier therein, the type of visual identifier may be selected, and a pattern of pixels corresponding to the visual identifier may be defined and encoded into corresponding pixels within a color image or other set of visual imaging data to form a steganographically encoded image. Such bits may be steganographically encoded into one or more of the least significant color, grayscale or black-and-white bits of channels of pixels of visual imaging data (e.g., bits of a single channel of a grayscale imaging data, or bits of multiple channels corresponding to base colors within the imaging data) without significantly impacting the overall quality of the visual imaging data.

For example, in a 24-bit representative pixel of visual imaging data, some of the least significant bits of each of the color channels may be co-opted and modified in order to encode a visual identifier within such pixels. Using six bits of data, for example, a visual identifier may be embedded into two bits of each of three channels (e.g., red, green and blue) of visual imaging data. As is discussed above, when using two bits of each of the three channels in a region of representative color pixels to generate a contrast for storing visual identifiers therein, the color variability in the region of pixels drops from 16,777,216 to 262,144, or by one sixty-fourth, a difference that may not be readily discerned by the human eye, even when the region is viewed independent from other color pixels within the visual image. When the region including the modified pixels is surrounded by regions of tens, hundreds or even thousands of other color pixels that have not been so altered, however, the difference in color quality between the representative color pixel and the other color pixels is functionally insignificant. Those of ordinary skill in the pertinent arts will recognize that imaging data having pixels of more than twenty-four bits (e.g., thirty bits, thirty-six bits, forty-eight bits, two hundred fifty-six bits), or fewer than twenty-four bits, may be utilized to generate a steganographically encoded image having visual identifiers therein.

Therefore, in accordance with the present disclosure, when evaluating the pixels of a segmented region or sector in order to identify one or more representative pixels into which a visual identifier may be encoded, the systems and methods disclosed herein may consider factors or variables pertaining to the variances in image noise such as signal-to-noise ratios or other related factors or variables. For example, a predetermined threshold for a pixel variance or signal-to-noise ratio may be determined for each of a plurality of segmented regions or sectors, or for a given segmented region or sector, and all pixels having variances below a first threshold, or signal-to-noise ratios above a second threshold, may be excluded from consideration as representative pixels.

After a visual identifier has been encoded into representative pixels of a visual imaging data file, the modified visual imaging data file may be stored in one or more data stores, and utilized for any purpose. For example, the representative pixels having the visual identifier encoded therein may be identified from a stored modified visual imaging data file according to the same strategy by which the representative pixels were originally identified (e.g., at random, according to one or more patterns, or based on attributes of the depth information or data or the visual imaging data). The visual identifier may then be recognized and used to access supplemental information or content, e.g., directly or from an external resource, and utilized for any purpose. For example, as is shown in FIGS. 1B through 1D, supplemental information or data associated with the bicycle 10A (e.g., all or portions of data provided on the network page 116) may be accessed and presented to the user 130 on the user interface 134, e.g., in the window 14, once the steganographically encoded bar code 12 is recognized by the smartphone 132.

Those of ordinary skill in the pertinent arts will recognize that references to a "least significant bit" herein may refer to not only lowest-valued bits of a pixel (e.g., ones-place bits) but also one or more other bits of comparatively low significance, or "less significant bits," including those bits that may immediately follow or have a next-highest significance above a lowest-valued bit in a given pixel. For example, in accordance with the present disclosure, one, two, three or more bits of a representative pixel of a visual image (e.g., a color, grayscale or black-and-white pixel) may be modified to store a visual identifier within the visual image. Accordingly, those of ordinary skill in the pertinent arts will recognize that the term "least significant bit," as used herein, may refer to a single bit of a pixel having a lowest value of all bits in the pixel, and may also refer to two or more bits of the pixel having the lowest values of all bits in the pixel.

Figure 2:
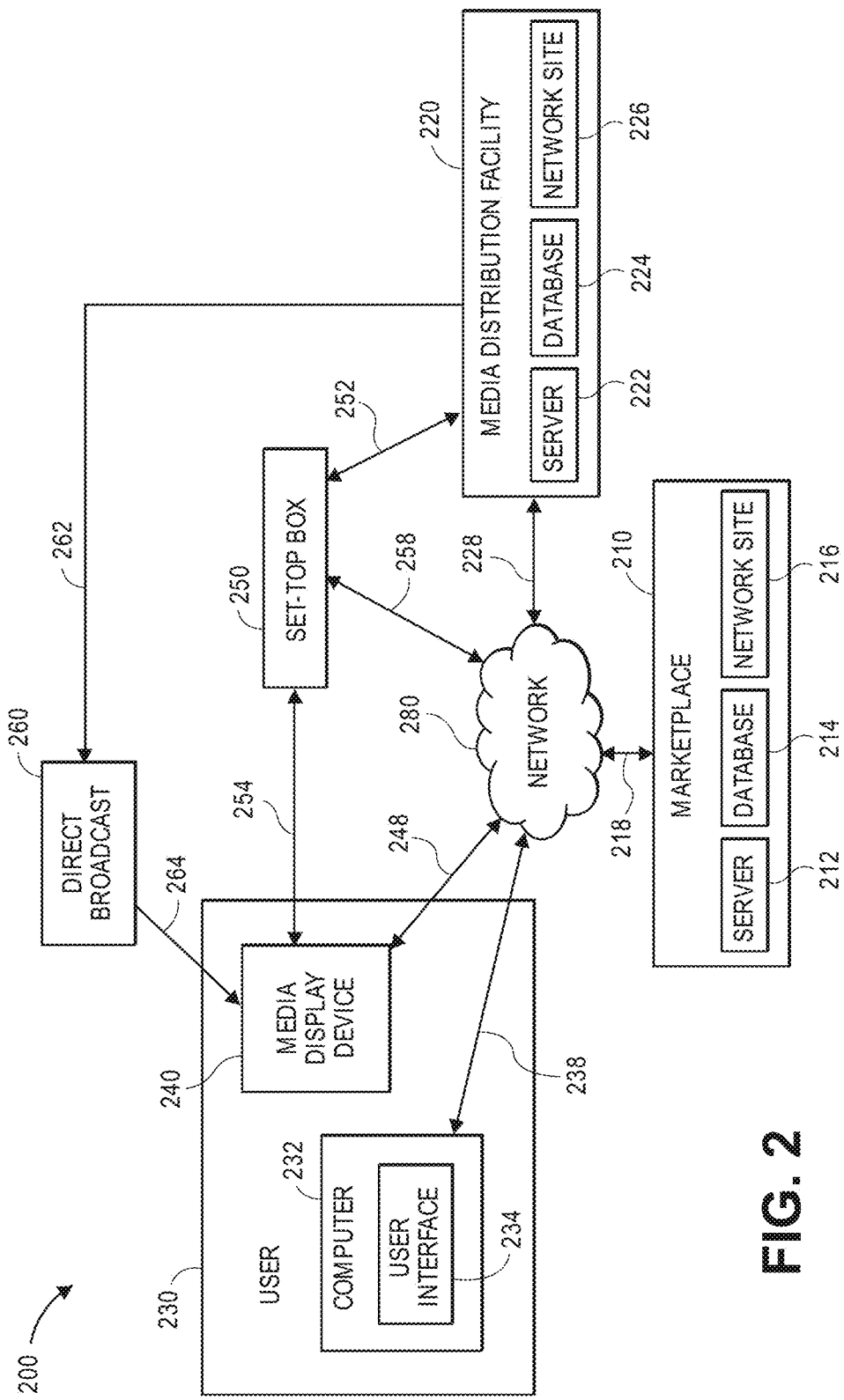
FIG. 2 is a block diagram of components of one system for steganographic camera communication in accordance with embodiments of the present disclosure.

Referring to FIG. 2, a block diagram of components of one system 200 for steganographic camera communication in accordance with embodiments of the present disclosure is shown. Except where otherwise noted, reference numerals preceded by the number "2" shown in the block diagram of FIG. 2 indicate components or features that are similar to components or features having reference numerals preceded by the number "1" shown in FIGS. 1A through 1D.

The system 200 of FIG. 2 includes a marketplace 210, a media distribution facility 220 and a user 230 (e.g., a customer) having devices that may be connected to one another over a network 280. The marketplace 210 may be any entity or individual that wishes to make items from a variety of sources (e.g., vendors, manufacturers, merchants or sellers) available for download, purchase, rent, lease or borrowing by customers using a networked computer infrastructure, including one or more physical computer servers 212 and databases 214 (or data stores) for hosting a network site 216 (or network sites). The marketplace 210 may be physically or virtually associated with one or more storage or distribution facilities, such as a fulfillment center, and/or with one or more vendors, manufacturers, merchants or sellers (not shown). The network site 216 may be implemented using the one or more servers 212, which connect or otherwise communicate with the one or more databases 214 as well as the network 280, as indicated by line 218, through the sending and receiving of digital data. Moreover, the databases 214 may include any type of information regarding items that have been made available for sale through the marketplace 210, or ordered by customers, such as the customer 230, from the marketplace 210, or any information or data regarding deliveries of such items to the customers.

The media distribution facility 220 may be any source or origin of digital media, e.g., still or moving images or other video content, audio content or other multimedia by way of a networked computer infrastructure, including one or more physical computer servers 222 and databases 224 (or data stores) for hosting a network site 226 (or network sites). For example, the media distribution facility 220 of FIG. 2 may be provided in connection with one or more physical or virtual services configured to manage or monitor such files, as well as one or more other functions. The servers 222 may be connected to or otherwise communicate with the databases 224 and the network site 226. The databases 224 may store any type of information or data, including digital media files or any like files containing multimedia (e.g., audio and/or video content), for any purpose. The servers 222 and/or the network site 226 may also connect to or otherwise communicate with the network 280, as indicated by line 228, through the sending and receiving of digital data.

In some embodiments, the media distribution facility 220 may be an Internet-based streaming content and/or media service provider. In some other embodiments, the media distribution facility 220 may be a media sharing system. In still other embodiments, the media distribution facility may be a radio or television station (e.g., for over-the-air, cable or Internet-based broadcasts) configured to distribute the media via any number of wired or wireless connections. For example, the media distribution facility 220 may be configured to distribute media over the network 280 to one or more general purpose computers or computers that are dedicated to a specific purpose. The media distribution facility 220 may also be configured to transmit content via a direct broadcast system 260, e.g., a satellite-based distribution system, over the line 262, which may be a wired or wireless connection. The media distribution facility 220 may further be configured to transmit content to one or more specifically configured components such as set-top boxes 250 or like units or components (e.g., cable boxes or converters), over the line 252, which may be a wired or wireless connection. The set-top boxes 250 may be configured to receive content from one or more other sources, in addition to the media distribution facility 220, such as from one or more networked computers via the network 280, as indicated by line 258.

The user 230 may be any individual having access to one or more computer devices or general purpose or special purpose devices for viewing content and/or communicating with other computer devices. For example, the user may operate a computer 232 and/or a media display device 240. The computer 232 may be any type of networked computer device (e.g., a personal digital assistant, a digital media player, a digital media player, a smartphone, a web pad, an electronic book reader, a desktop computer, a laptop computer or a tablet computer, as well as a wearable computer device such as a pair of augmented reality glasses or a wristwatch, or a computer device that may be incorporated into one or more vehicles or appliances) or any other like machine that may operate or access one or more software applications, such as a browser or a shopping application, via a user interface 234, and may be connected to or otherwise communicate with the marketplace 210, the media distribution facility 220 or any other external computer devices (not shown) through the network 280, as indicated by line 238, by the transmission and receipt of digital data.

In particular, the computer 232 may include one or more onboard or associated imaging devices provided thereon or therewith. For example, the computer 232 may include one or more imaging devices having RGB sensors, depth sensors, memory or storage components, processors or any other features that may be required in order to capture, analyze and/or store imaging data from within an environment, including but not limited to images or other content rendered by the media display device 240. For example, the computer 232 and any imaging devices or sensors provided thereon may be configured to capture one or more still or moving images, along with any relevant audio signals or other information. The imaging devices provided on or in association with the computer 232 may be any type or form of system component for capturing imaging data (e.g., reflected light) of any kind or for any purpose. For example, in some embodiments, such imaging devices may include a red, green, blue ("RGB") color camera, a still camera, a motion capture/video camera or any other type or form of camera. In other embodiments, such imaging devices may include a depth-sensing camera, such as an RGBz (or RGBD) camera. In still other embodiments, such imaging devices may include a thermographic or infrared (IR) camera. Additionally, in some embodiments, such imaging devices may include a camera module including a lens and an image sensor configured to convert an optical image obtained by the lens of the camera into a digital signal or digital representation of the image, including image resolutions of varying degrees that may be captured and stored at various rates (e.g., frames per second).

Although the system 200 shown in FIG. 2 includes a single user 230 having a single computer 232, and a single media display device 240, those of ordinary skill in the pertinent arts will recognize that any number of computer devices having any number or type of imaging devices thereon or therein, and any number of media display devices 240, may be provided within a given environment in accordance with the present disclosure.

The media display device 240 may be a television, a monitor or any other like machine having a screen for viewing rendered video content. For example, the media display device 240 may incorporate any number of active or passive display technologies or systems, including but not limited to electronic ink, liquid crystal displays (or "LCD"), light-emitting diode (or "LED") or organic light-emitting diode (or "OLED") displays, cathode ray tubes (or "CRT"), plasma displays, electrophoretic displays, image projectors, or other display mechanisms including but not limited to micro-electromechanical systems (or "MEMS"), spatial light modulators, electroluminescent displays, quantum dot displays, liquid crystal on silicon (or "LCOS") displays, cholesteric displays, interferometric displays or others. As is shown in FIG. 2, the media display device 240 may be configured to receive content from any number of sources via one or more wired or wireless connections, including but not limited to the direct broadcast system 260, via the line 264; the set-top box 250, via the line 254, or one or more computer devices over the network 280, via the line 248.

Those of ordinary skill in the pertinent arts will recognize that the media display 240 may include any number of hardware components or operate any number of software applications for receiving and rendering content from the media distribution facility 220 via the direct broadcast system 260 and/or the set-top box 250, including any number of transceivers or like devices. Moreover, those of ordinary skill in the pertinent arts will further recognize that the components or functions of the set-top box 250 may be performed by or within the media display device. Alternatively, in some embodiments, the media display device 240 need not be associated with the user 230. For example, the media display device 240 may be provided in a public place, beyond the control of the user 230, e.g., a television provided in a bar, restaurant, transit station, or shopping center, or an electronic billboard provided in a population center or along a transit line. In some other embodiments, the media display device 240 may be a billboard, a frame, an easel or any other system configured for displaying a print image that is steganographically encoded with one or more visual identifiers, and need not be connected to any type or form of network or interactive system, or operate under electrical power.

The network 280 may be any wired network, wireless network, or combination thereof, and may comprise the Internet in whole or in part. In addition, the network 280 may be a personal area network, local area network, wide area network, cable network, satellite network, cellular telephone network, or combination thereof. The network 280 may also be a publicly accessible network of linked networks, possibly operated by various distinct parties, such as the Internet. In some embodiments, the network 280 may be a private or semi-private network, such as a corporate or university intranet. The network 280 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein.

Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The marketplace server 212, the media distribution facility server 222, the user computer 232, the user media display device 240, the set-top box 250 and/or the direct broadcast system 260 may use any web-enabled or Internet applications or features, or any other client-server applications or features including E-mail or other messaging techniques, to connect to the network 280, or to communicate with one another, such as through short or multimedia messaging service (SMS or MMS) text messages. For example, the servers 212, 222, the computer 232, the media display device 240, the set-top box 250 and/or the direct broadcast system 260 may be configured to transmit information or data in the form of synchronous or asynchronous messages to one another in real time or in near-real time, or in one or more offline processes, via the network 280. Those of ordinary skill in the pertinent art would recognize that the marketplace 210, the media distribution facility 220 or the user 230 may operate any of a number of computing devices that are capable of communicating over the network 280. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the servers 212, 212 or the computer 232, or to any other computers or control systems utilized by the marketplace 210, the media distribution facility 220 or the user 230, or by or in association with the direct broadcast system 260 and/or the set-top box 250, and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks, e.g., the network 280.

Figure 3:
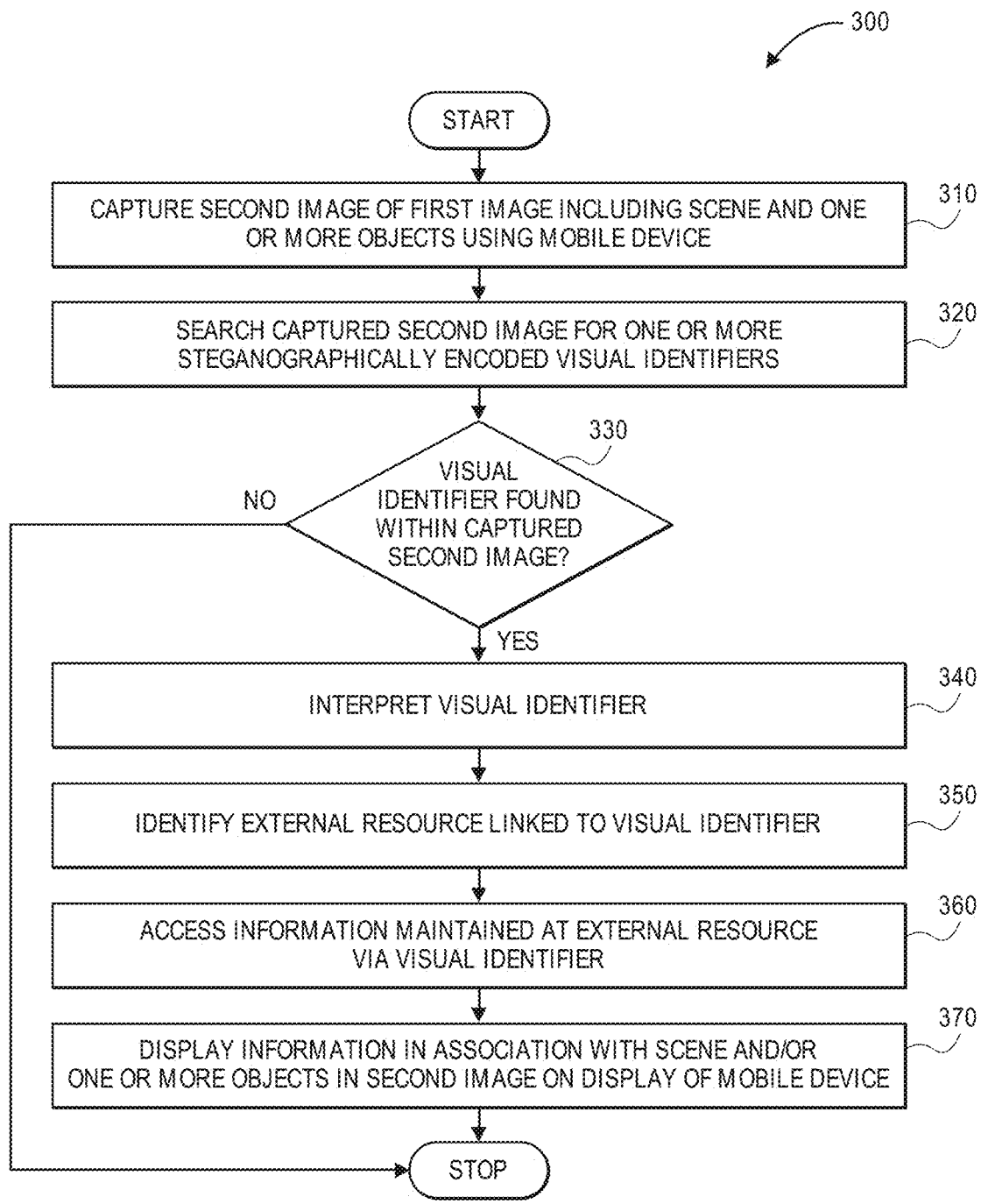
FIG. 3 is a flow chart of one process for steganographic camera communication in accordance with embodiments of the present disclosure.

As is discussed above, the systems and methods of the present disclosure may be directed to displaying imaging data that is steganographically encoded with one or more visual identifiers on a display device, identifying supplemental information or content relating to the imaging data based on the one or more visual identifiers, and displaying some or all of the supplemental information or content on another display device, e.g., a display device provided on a mobile device such as a smartphone or tablet computer. Referring to FIG. 3, a flow chart 300 of one process for steganographic camera communication in accordance with embodiments of the present disclosure is shown. At box 310, using a mobile device, a second image is captured of a first image that includes a scene and one or more objects. For example, referring again to FIG. 1D, a user, such as the user 130, may orient a smartphone, a tablet computer or another mobile device having a camera or other imaging device and a display screen toward a video display, a billboard or another machine or apparatus having digital video content or other information rendered thereon, and may capture one or more still or moving images of the video content.

At box 320, the captured second image is searched for one or more steganographically encoded visual identifiers. In accordance with the present disclosure, images or imaging data may be searched or otherwise evaluated in any manner. For example, in some embodiments, each and every image or frame may be individually searched for steganographically encoded content, such as one or more steganographically encoded visual identifiers. In some other embodiments, images or frames may be searched at any interval, e.g., after a predetermined number of images or frames have passed, or after a predetermined length of time has lapsed. Moreover, the images or frames may be searched in their entirety, or in predetermined locations (e.g., about perimeters or other areas of the respective images or frames), for one or more steganographically encoded visual identifiers.

Alternatively, in some embodiments, the mobile device may be configured to search predetermined locations within or aspects of the images or frames for a steganographically encoded indicator, e.g., a specific or predefined symbol, character or other type of marking indicative of whether an image or frame includes one or more visual identifiers. In some embodiments, a steganographically encoded indicator may indicate that a particular image or frame includes one or more steganographically encoded visual identifiers elsewhere throughout the image or frame. If a predetermined location of an image or frame does not include the indicator, then it may be assumed that the image or frame does not include any visual identifiers, and the entire image or frame need not be searched, e.g., according to a predetermined strategy or on any other basis. If the predetermined location of the image or frame includes the indicator, however, then it may be assumed that the image or frame includes one or more visual identifiers therein, and the balance of the image or frame may be searched for such identifiers accordingly. Additionally, such indicators may not only indicate that an image or frame includes one or more visual identifiers steganographically encoded therein, but also identify a location within the image or frame where such visual identifiers are encoded. Alternatively, a steganographically encoded indicator may indicate that a particular image or frame does not include any steganographically encoded visual identifiers elsewhere throughout the image or frame. Thus, if a predetermined location of an image or frame includes the indicator, then it may be assumed that the image or frame does not include any visual identifiers, and the entire image or frame need not be searched. If the predetermined location of the image or frame does not include the indicator, however, then it may be assumed that the image or frame includes one or more visual identifiers therein, and the balance of the image or frame may be searched for such identifiers accordingly.

At box 330, whether a visual identifier is found within the captured second image is determined. If a visual identifier is not found within the captured second image, then the process ends. If a visual identifier is found, however then the process advances to box 340, where the visual identifier is interpreted, and to box 350, where an external resource linked to the visual identifier is identified. For example, where the visual identifier is a bar code or a URL, the bar code or URL may be decoded and recognized as a reference to a network page or other external resource relating to the visual identifier having information, data or other content included therein.

At box 360, information maintained at an external resource is accessed via the visual identifier. For example, the information may be hosted at a network site or other external resource linked to the visual identifier, e.g., a bar code or a URL, and may be accessed after the visual identifier is interpreted. Alternatively, in some embodiments, the visual identifier may be a set of text or other characters representing supplemental information or content relating to the imaging data, and need not be maintained at any external resource. At box 370, the information is displayed in association with the scene or one or more objects in the second image on a display of the mobile device, and the process ends. For example, the information may be rendered in a window or other feature superimposed upon the second image on the display, such as is shown in FIG. 1D. Alternatively, where the visual identifier is a bar code or a URL associated with a network page, the network page may replace the second image on the display of mobile device, e.g., by loading and rendering the network page thereon.

As is discussed above, visual identifiers may be steganographically encoded into imaging data by generating patterns of contrast between adjacent portions of the imaging data that are visible only to imaging devices and associated computer processors, and not to humans. By steganographically altering one or more least significant bits or less significant bits of representative pixels within a region of an image in a pattern that is consistent with a bar code, a symbol, one or more alphanumeric characters, or other visual identifiers or portions thereof, information regarding content of the image, or links to such information, may be made available to users of imaging devices that are configured to capture images thereof and scan and/or interpret such images accordingly.

Figure 4A:
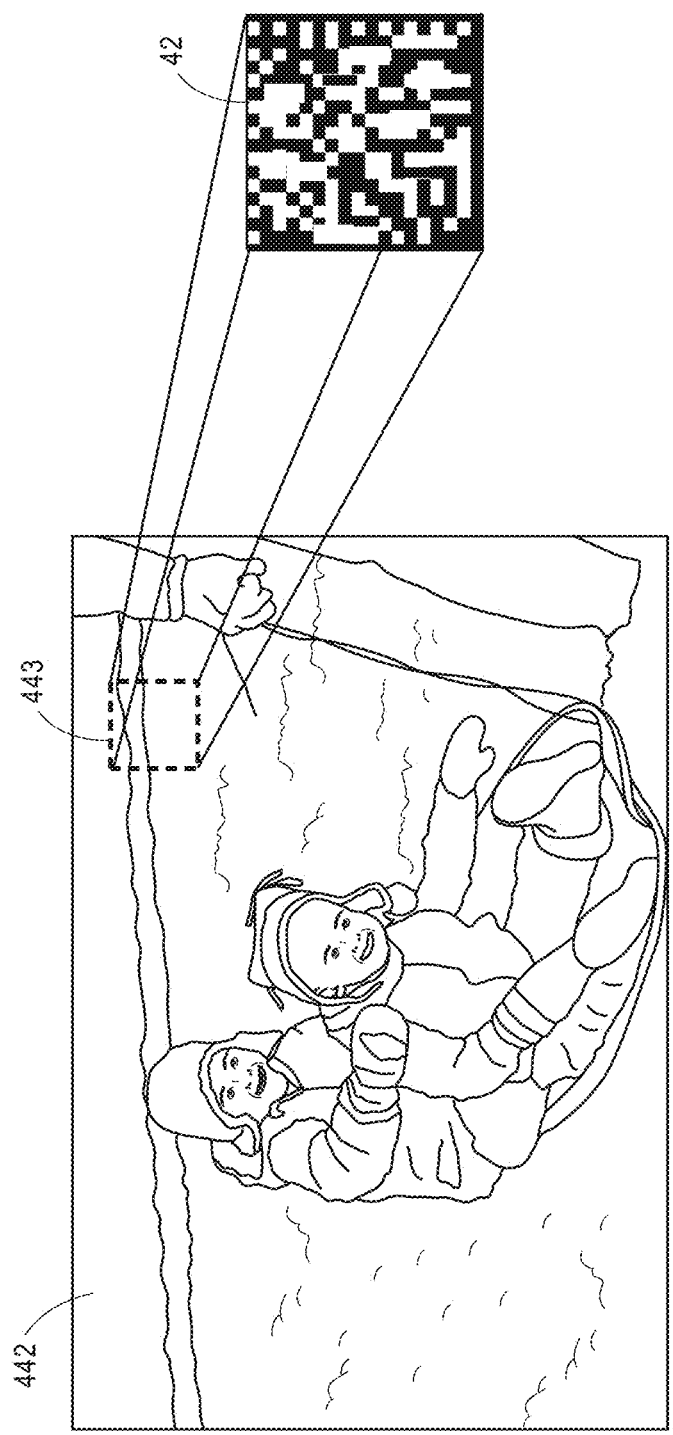
FIGS. 4A through 4C are views of aspects of one system or process for steganographic camera communication in accordance with embodiments of the present disclosure.
Figure 4B:
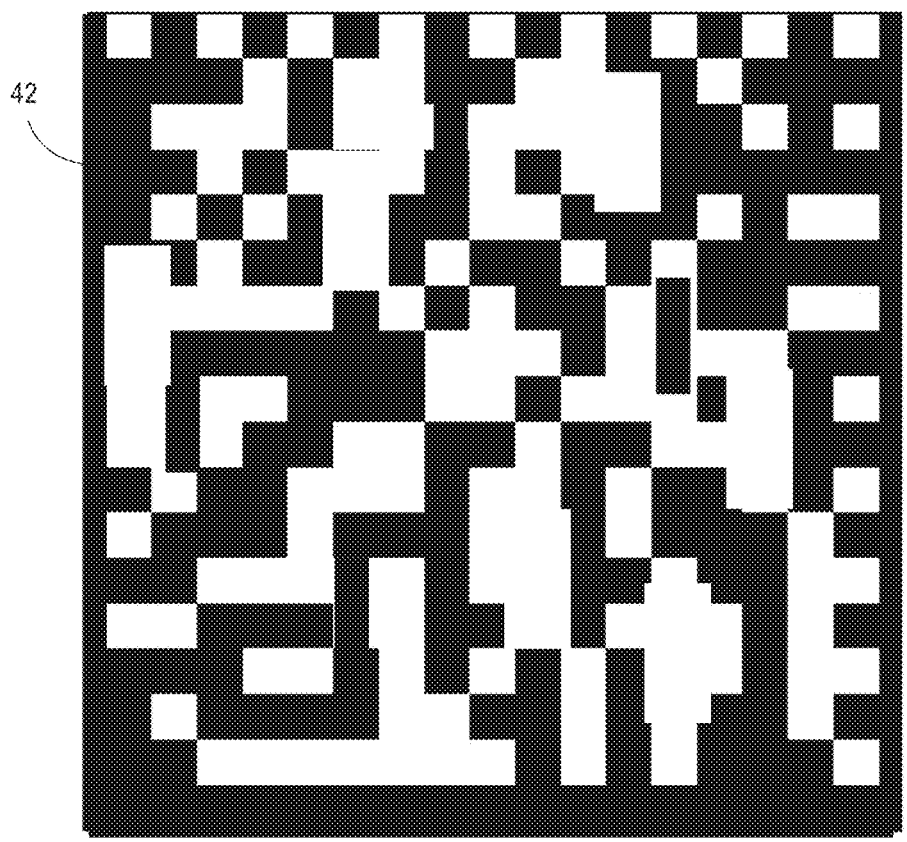
Figure 4C:
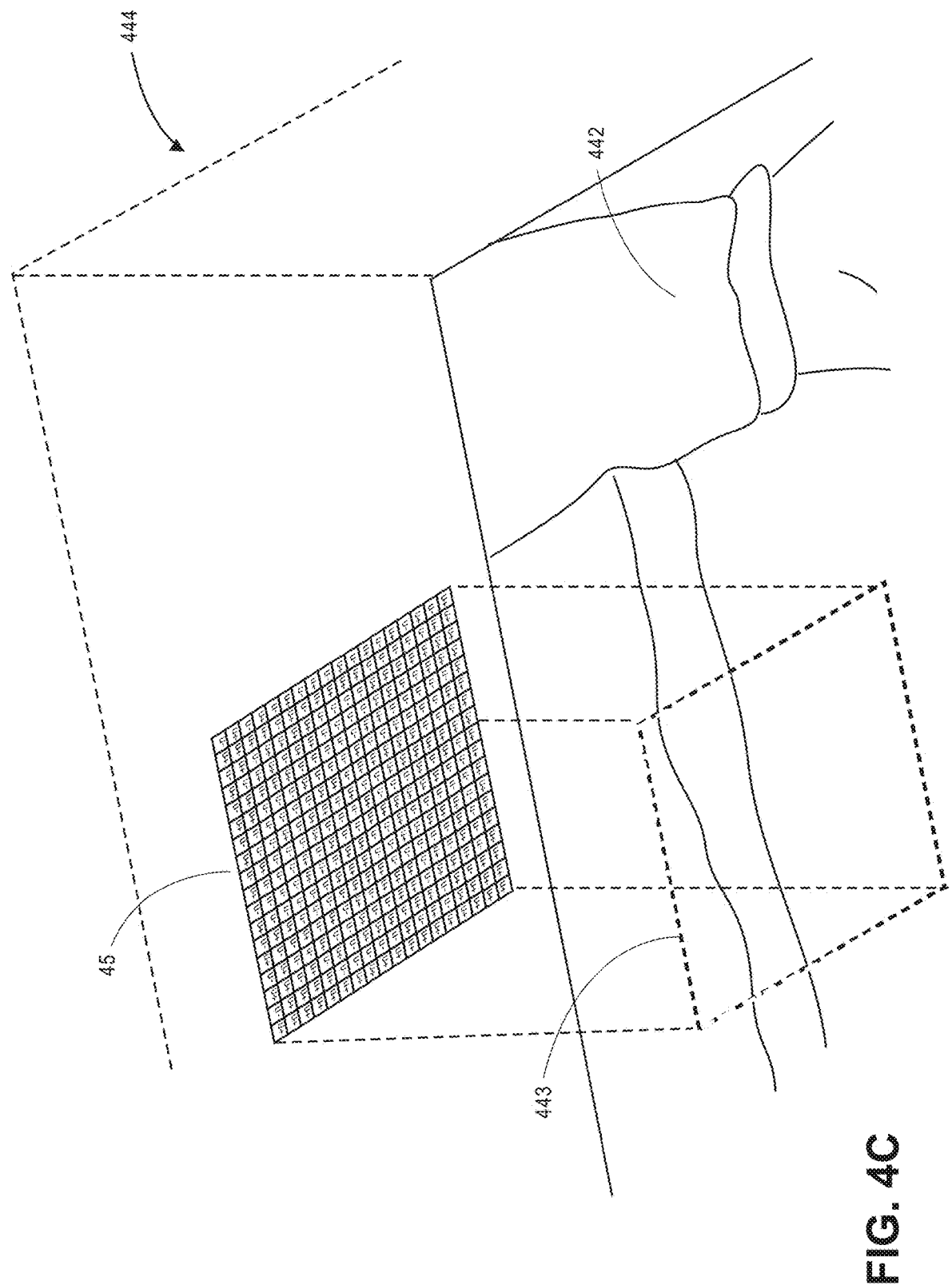

Referring to FIGS. 4A through 4C, views of aspects of one system or process for steganographic camera communication in accordance with embodiments of the present disclosure are shown. Except where otherwise noted, reference numerals preceded by the number "4" shown in FIGS. 4A through 4C indicate components or features that are similar to components or features having reference numerals preceded by the number "2" shown in FIG. 2, or by the number "1" shown in FIGS. 1A through 1D.

As is shown in FIG. 4A, a visual identifier 42 (viz., a Data Matrix two-dimensional bar code) that is linked to or associated with content of a visual image 442 may be steganographically encoded into a portion 443 of the visual image 442. The portion 443 of the visual image 442 may be selected on any basis, including a relation to the content of the visual image 442, any characteristics or qualities of the representative pixels in the portion 443, or any other relevant factor. Amounts or extents to which such pixels must be modified may be determined based on the attributes of the visual identifier 42. For example, as is shown in FIG. 4B, the visual identifier 42 comprises an eighteen-by-eighteen grid of dark or light sections or segments. An eighteen-by-eighteen cell array 45 of corresponding sections or segments including amounts or extents to which pixels within such sections or segments must be steganographically modified in order to encode the visual identifier 42 into the visual image 442 may be determined on any basis, including but not limited to the characteristics or qualities of the representative pixels to be modified, as well as minimum or maximum thresholds for detectability or invisibility, or any other factor.

For example, as is shown in FIG. 4B, the array 45 indicates that pixel values in sections or segments corresponding to darkened (or black) areas of the visual identifier 42 shall be increased by a value of +n (e.g., in binary or decimal, according to a hexadecimal model or any other model), while pixel values in sections or segments corresponding to lightened (or white) areas of the visual identifier 42 shall be decreased by a value of −n. Those of ordinary skill in the pertinent arts will recognize that contrasts may be steganographically encoded into a visual image in any manner and by any extent. For example, referring again to the array 45 of FIG. 4B, alternatively, pixel values in sections or segments corresponding to lightened (or white) areas of the visual identifier 42 may be increased, and pixel values in sections or segments corresponding to darkened (or black) areas of the visual identifier 42 may be decreased, in order to generate the same contrast. Moreover, the extent to which a section or segment corresponding to darkened (or black) areas of the visual identifier 42 is modified need not be equal in magnitude and opposite in direction to the extent to which a section or segment corresponding to lightened (or white) areas of the visual identifier 42 is modified. Furthermore, where the portion 443 of the visual image 442 into which the visual identifier 42 is to be encoded varies in brightness, saturation or hue, representative pixels within the portion 443 may be modified by various amounts or to various extents, as necessary, in order to encode the visual identifier 42 therein.

As is shown in FIG. 4C, once the amounts or extents to which the representative pixels within the portion 443 are to be modified is determined, e.g., as is expressed in the array 45, the least significant bits or less significant bits of such pixels may be steganographically modified in a manner consistent with the array 45, in order to form a modified visual image 444 with the visual identifier 42 virtually encoded therein. Subsequently, an imaging device that is configured to capture imaging data from the modified visual image 444 may recognize and interpret the visual identifier 42, and identify supplemental information relating to the visual image 442.

As is also discussed above, visual identifiers such as bar codes, alphanumeric characters formed into text or hyperlinks, or any other content, may be encoded into any portion of visual imaging data, including but not limited to locations within the visual imaging data that pertain or relate to specific aspects or portions of the visual imaging data, such as one or more objects depicted within such aspects or portions. Referring to FIGS. 5A through 5D, views of aspects of one system or process for steganographic camera communication in accordance with embodiments of the present disclosure are shown. Except where otherwise noted, reference numerals preceded by the number "5" shown in FIGS. 5A through 5D indicate components or features that are similar to components or features having reference numerals preceded by the number "4" shown in FIGS. 4A through 4C, by the number "2" shown in FIG. 2, or by the number "1" shown in FIGS. 1A through 1D.

As is shown in FIG. 5A, visual imaging data 542 includes a plurality of commercial products 50A, 50B, 50C, 50D, 50E, including wall paint, a safety helmet, an interior door, a child's outfit and floor tile. The plurality of commercial products 50A, 50B, 50C, 50D, 50E are represented within the visual imaging data 542 by a plurality of colors. For example, the wall paint 50A is in an akaroa color having red, green and blue color values of (220, 194, 168) in decimal, or (11011100, 11000010, 10101000) in binary; the safety helmet 50B has portions in a royal blue color having red, green and blue color values of (77, 77, 222) in decimal, or (01001101, 01001101, 11011110) in binary; the interior door 50C is a gallery white color having red, green and blue color values of (243, 243, 243) in decimal, or (11110011, 11110011, 11110011) in binary; the child's outfit 50D has portions in a national flag blue color having red, green and blue color values of (49, 49, 74) in decimal, or (00110001, 00110001, 01001010) in binary; and the floor tile 50E has portions in a tana color having red, green and blue color values of (219, 219, 195) in decimal, or (11011011, 11011011, 11000011) in binary.

Figure 5B:
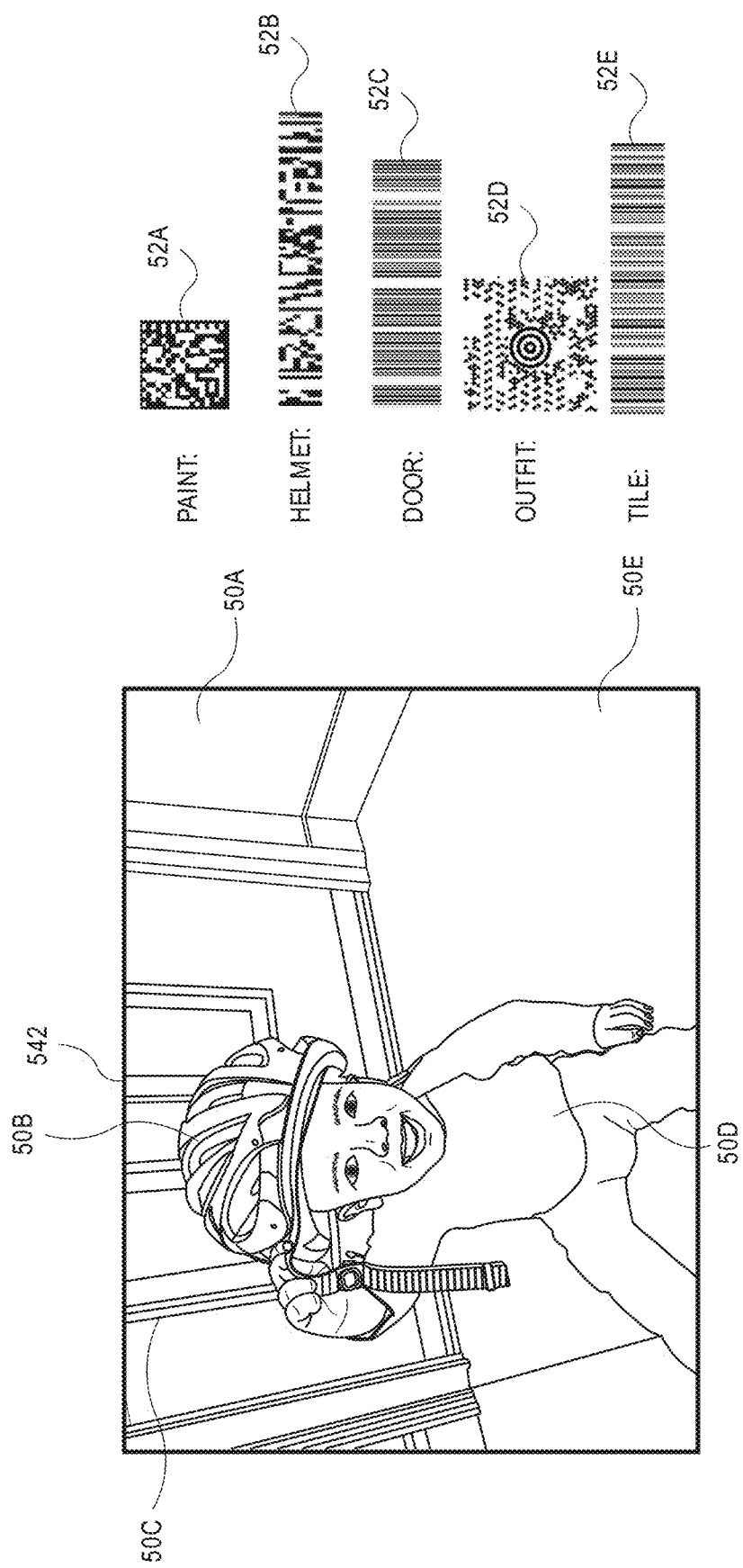

In some embodiments, visual identifiers that include or are linked to or otherwise associated with supplemental information or content corresponding to one or more aspects or portions of visual imaging data may be embedded into the visual imaging data, e.g., into one or more still images or moving images. For example, as is shown in FIG. 5B, a plurality of visual identifiers 52A, 52B, 52C, 52D, 52E corresponding to each of the commercial products 50A, 50B, 50C, 50D, 50E are shown. The visual identifiers 52A, 52B, 52C, 52D, 52E shown in FIG. 5B are bar codes that have been encoded in association with supplemental information or content, e.g., links to one or more external resources such as network pages or other sources of data regarding the commercial products 50A, 50B, 50C, 50D, 50E. For example, the visual identifier 52A is a two-dimensional Data Matrix bar code, while the visual identifier 52B is a one-dimensional PDF 417 bar code. The visual identifier 52C is a one-dimensional Code 39 bar code, while the visual identifier 52D is a two-dimensional MaxiCode bar code and the visual identifier 52E is a one-dimensional Code 128 bar code. Each of the visual identifiers 52A, 52B, 52C, 52D, 52E may be encoded with supplemental information or content, or with links to supplemental information or content, and may themselves be encoded into portions of the visual imaging data 542 corresponding to the respective portions of the respective commercial products 50A, 50B, 50C, 50D, 50E, and may thereby form modified visual imaging data 544 that may be stored in one or more data stores.

Figure 5C:
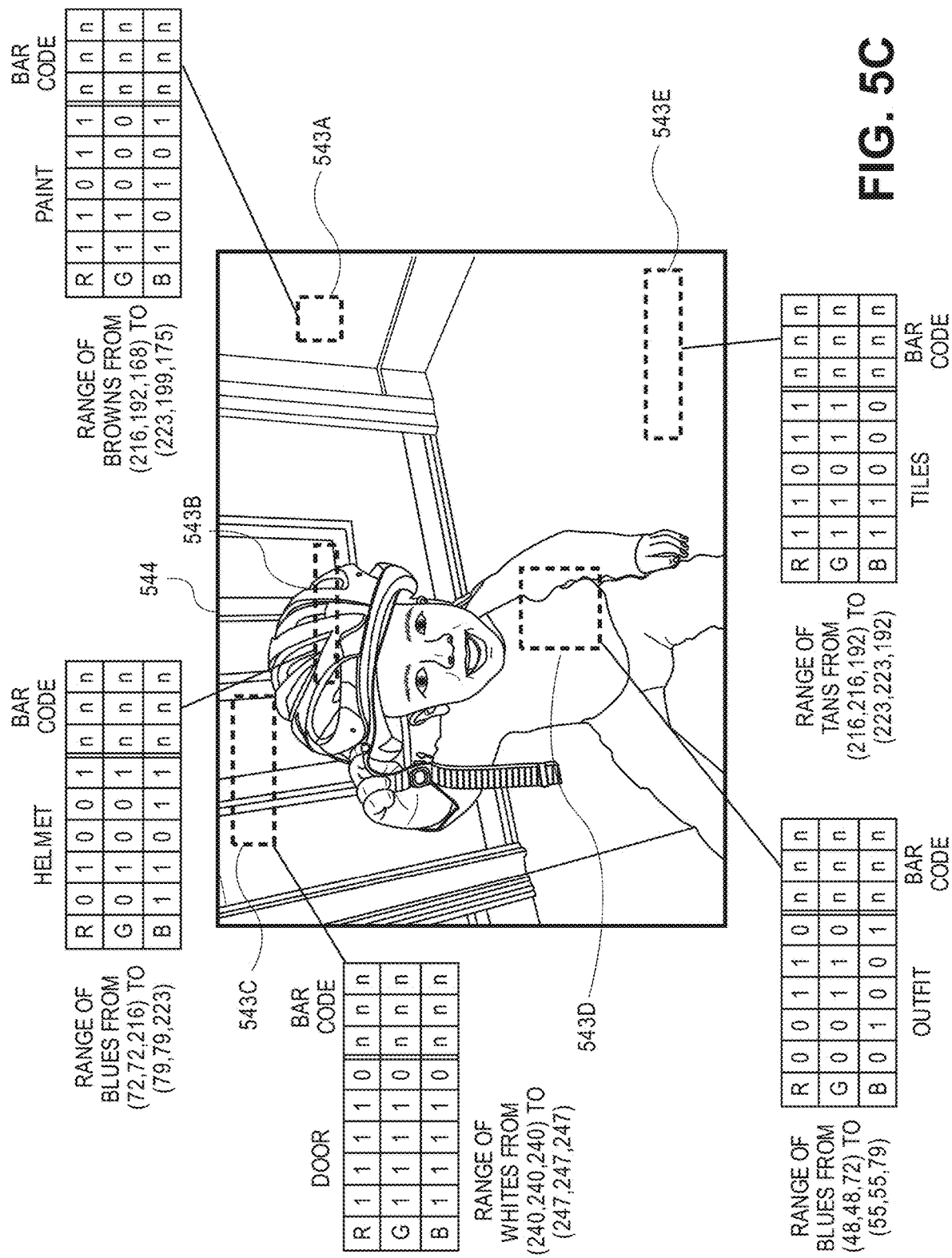

For example, as is shown in FIG. 5C, the visual identifier 52A may be encoded into a portion of the visual imaging data 542 including representative pixels corresponding to the paint 50A. In some embodiments, as is discussed above with regard to FIGS. 4A through 4C, one or more least significant bits or less significant bits of each of the red, green and blue color channels of selected representative pixels in a portion 543A of the visual imaging data 542 into which the visual identifier 52A is to be encoded may be modified slightly, as necessary, in order to generate contrasts between and within such pixels for rendering the visual identifier 52A. A pattern corresponding to the visual identifier 52A may be encoded into the portion 543A of the visual imaging data 542 by changing values of the least significant bits or less significant bits of such pixels to zero or one, as necessary, which may cause the visual identifier 52A to be visible to one or more imaging devices and/or computer-based processing applications or components, yet remain invisible to the human eye. For example, as is shown in FIG. 5C, least significant bits or less significant bits of one or more of the akaroa pixels of the portion 543A of the visual imaging data 542 may be modified to cause the visual identifier 52A to be encoded therein, e.g., by converting such pixels to one or more brown colors having red, green and blue color values with ranges between (216, 192, 168) and (223, 199, 175) in decimal, or between (11011000, 11000000, 10101000) and (11011111, 11000111, 10101111) in binary. Likewise, least significant bits of one or more of the royal blue, gallery white, national flag blue or tana pixels of the visual imaging data may be modified to cause the visual identifiers 52B, 52C, 52D, 52E to be encoded therein, e.g., by converting pixels in a portion 543B to one or more blue colors having red, green and blue color values with ranges between (72, 72, 216) and (79, 79, 223) in decimal, pixels in a portion 543C to one or more white colors having red, green and blue color values with ranges between (240, 240, 240) and (247, 247, 247) in decimal, pixels in a portion 543D to one or more blue colors having red, green and blue color values with ranges between (48, 48, 72) and (55, 55, 79) in decimal, and pixels in a portion 543E to one or more tan colors having red, green and blue color values with ranges between (216, 216, 192) and (223, 223, 199) in decimal, respectively.

Figure 5D:
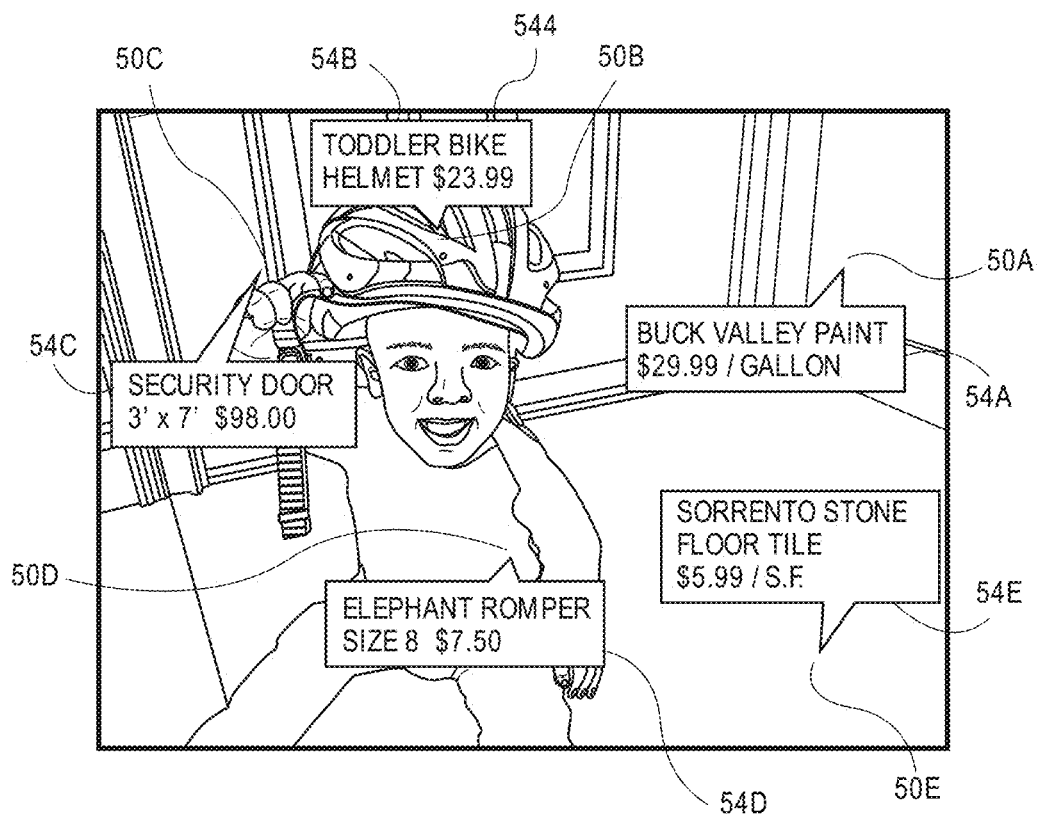

Once the modified imaging data 544 has been formed by encoding the visual identifiers 52A, 52B, 52C, 52D, 52E into the portions 543A, 543B, 543C, 543D, 543E of the visual imaging data 542, the modified imaging data 544 may be scanned, evaluated or photographed using one or more smartphones, tablet computers, mobile devices or other computers equipped or associated with one or more imaging devices, and the supplemental information or content associated with such identifiers 52A, 52B, 52C, 52D, 52E may be rendered thereby. For example, as is shown in FIG. 5D, when an image is captured of the imaging data 544, and the visual identifiers 52A, 52B, 52C, 52D, 52E are recognized and interpreted, supplemental information or content may be displayed in one or more windows 54A, 54B, 54C, 54D, 54E. In some embodiments, such as is shown in FIG. 5D, the supplemental information or content displayed upon recognizing and interpreting one or more visual identifiers may include alphanumeric characters (e.g., text, numbers and/or symbols) embodied in such identifiers, or text that is maintained in an external resource to which the identifiers may be linked (e.g., one or more network sites).

Moreover, the supplemental information or content steganographically embedded into visual imaging data, or linked to one or more identifiers embedded therein, may be provided for a specific purpose. For example, in the embodiment of FIGS. 5A through 5E, where the visual imaging data 542 is a portion of a motion picture (e.g., a digital image or a series of digital images), the visual imaging data 542 may be modified by embedding the visual imaging data 542 with identifying information regarding the one or more commercial products 50A, 50B, 50C, 50D, 50E shown in the visual imaging data 542, or information regarding pricing or availability of the commercial products 50A, 50B, 50C, 50D, 50E. Thus, when a viewer of the modified imaging data 544 shown in FIG. 5D captures an image of the modified imaging data 544 using a mobile device equipped with a camera or other imaging device, such as the smartphone 132 shown in FIG. 1D, the visual identifiers 52A, 52B, 52C, 52D, 52E may be recognized and interpreted, and the supplemental information or content associated with such identifiers 52A, 52B, 52C, 52D, 52E may be retrieved and shown in the windows 54A, 54B, 54C, 54D, 54E. In some other embodiments, the windows 54A, 54B, 54C, 54D, 54E may contain links to one or more network sites or other external resources having features which enable a customer to purchase one or more of the respective commercial products 50A, 50B, 50C, 50D, 50E. In still other embodiments, the supplemental information or content may be of any type or form, and need not relate to any commercial function or purpose.

Figure 6:
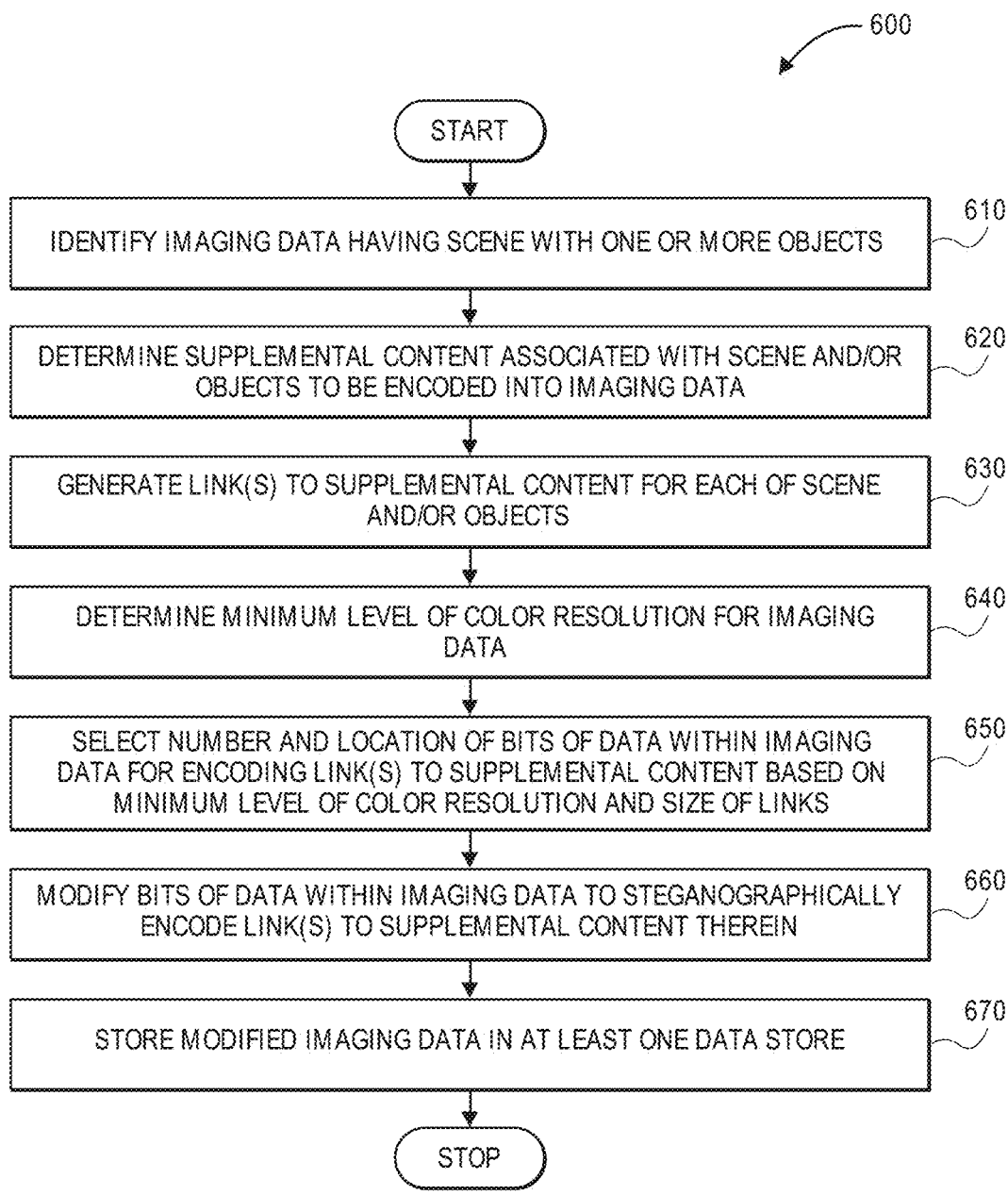
FIG. 6 is a flow chart of one process for steganographic camera communication in accordance with embodiments of the present disclosure.

As is discussed above, a visual identifier including alphanumeric characters, symbols, optically readable identifiers (e.g., bar codes) or any other content may be steganographically encoded into one or more discrete locations within a set of visual data, e.g., by selecting such locations, identifying a predetermined number of least significant bits or less significant bits within representative pixels in such locations, and modifying such bits to accommodate the visual identifier in a manner that creates a visual contrast that may be recognized by an imaging device and one or more associated computer components or modules, but remains invisible to the human eye. Referring to FIG. 6, a flow chart 600 of one process for steganographic camera communication in accordance with embodiments of the present disclosure is shown. At box 610, imaging data having a scene with one or more objects therein is identified. The imaging data may be captured and stored in one or data stores, indexed, and subsequently retrieved, or may be captured and identified as including the scene and the one or more objects therein in real time or in near-real time. In some embodiments, the imaging data may be a single visual image. In other embodiments, the imaging data may include one or more frames of visual imaging data, e.g., motion pictures.

At box 620, supplemental content associated with the scene and/or the objects that is to be encoded into the imaging data is determined. For example, the supplemental content may include descriptors of the scene in terms of its real or fictional location, as well as any relevant times, dates or prevailing weather conditions (e.g., temperatures, humidities or precipitation) at the scene. The supplemental content may also include descriptors of the objects, e.g., names, categories or other labels of such objects, which may be structures, vehicles, machines, animals (e.g., humans) or any other type of object that may be visibly depicted in imaging data, in whole or in part. At box 630, one or more links to the supplemental content is generated for each of the scene and/or the objects. For example, referring again to FIGS. 5B and 5C, the visual identifiers 52A, 52B, 52C, 52D, 52E may each be generated and associated with a respective aspect of the imaging data. Alternatively, a single visual identifier may be generated and provided for the scene and objects in its entirety. In some embodiments, the links may be bar codes or hyperlinks to the supplemental content, or to one or more external resources having the supplemental content stored thereon, e.g. network pages and/or one or more remote servers. Alternatively, the supplemental content itself may be steganographically encoded into the imaging data.

At box 640, a minimum level of color resolution for the imaging data is determined. As is discussed above, the steganographic encoding of data into imaging data is accomplished at a cost in terms of clarity and resolution. Therefore, a minimum level of color resolution for imaging data that may be permitted in order to ensure that data is encoded therein in a manner that is invisible to the human eye may be selected. At box 650, a number and location of bits of data within the imaging data for encoding links to the supplemental content is selected based on the minimum level of color resolution and the size of the links. For example, as is discussed above, a visual identifier of any type, shape or form may be encoded into any portion of imaging data. Therefore, a portion of the visual imaging data that is large enough to accommodate the visual identifier, and includes representative pixels that may be adequately modified in order to generate a minimum level of visual contrast needed in order for the visual identifier to be recognized and interpreted, while maintaining the minimum level of resolution, may be chosen accordingly.

At box 660, bits of data within the imaging data are modified to steganographically encode the links to the supplemental content therein. The links may be encoded in a manner that defines a sufficient level of visual contrast, e.g., by co-opting one or more least significant bits or less significant bits within some of the representative pixels identified at box 650. For example, as is discussed above with regard to FIGS. 1A through 1D, or FIGS. 4A through 4C, bits of the red, green and blue color channels of specific pixels in shapes and formats of the visual identifiers may be modified in order to encode the visual identifiers therein. At box 670, the modified imaging data is stored in at least one data store, and the process ends.

As is discussed above, visual identifiers may be steganographically encoded into any portion of visual imaging data, including into one or more locations that may be identified or selected on any basis. Referring to FIGS. 7A through 7D, views of aspects of one system or process for steganographic camera communication in accordance with embodiments of the present disclosure are shown. Except where otherwise noted, reference numerals preceded by the number "7" shown in FIGS. 7A through 7D indicate components or features that are similar to components or features having reference numerals preceded by the number "5" shown in FIGS. 5A through 5D, by the number "4" shown in FIGS. 4A through 4C, by the number "2" shown in FIG. 2, or by the number "1" shown in FIGS. 1A through 1D.

Figure 7A:
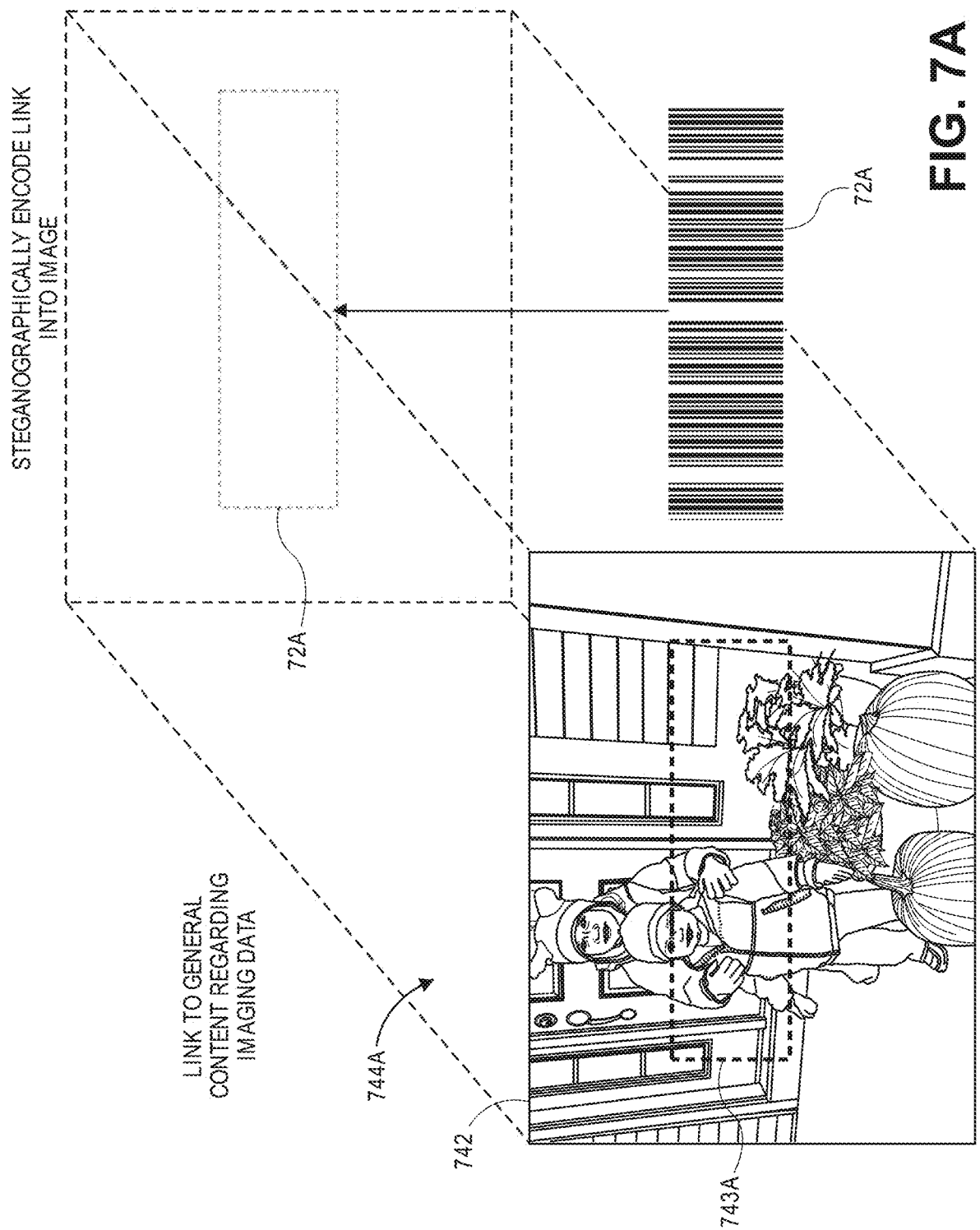

In some embodiments, a visual identifier associated with supplemental content may be steganographically encoded into an entire image or frame of imaging data, e.g., where the visual identifier relates to the image or frame of imaging data as a whole. As is shown in FIG. 7A, a single link 72A (e.g., a one-dimensional bar code) may be generally encoded into a central region 743A of an image frame 742, in order to form a modified image frame 744A. Thus, when the image frame 742 is displayed on a computer display, or printed into hard copy, and one or more images of the modified image frame 744A is captured, e.g., using a smartphone, a tablet computer or other computer device equipped or associated with an imaging device, the link 72A may be recognized and interpreted in order to access supplemental content regarding the image frame 742 and/or the contents thereof. For example, as is discussed above, representative pixels consistent with a pattern of the link 72A may be selectively altered within the region 743A in order to create visual contrasts that may be interpreted by imaging devices and/or computer devices, but are imperceptible to the human eye.

In some other embodiments, visual identifiers associated with supplemental content may be steganographically encoded in remote or eccentric locations within an image or frame of imaging data, e.g., about a perimeter of the image or frame. Thus, to the extent that the steganographic encoding impacts a level of clarity or resolution of the image or frame, any adverse effects of the steganographic encoding may be disposed in areas of limited visibility within the image or frame. As is shown in FIG. 7B, a plurality of links 72B-1, 72B-2, 72B-3 (e.g., one-dimensional and/or two-dimensional bar codes) may be generally encoded along a right side 743B-1 of the image frame 742, about a perimeter 743B-2 of the image frame 742, viz., along a bottom edge, or in a top left corner 743B-3 of the image frame 742. Representative pixels consistent with patterns of the links 72B-1, 72B-2, 72B-3 may be selectively incorporated into the portions 743B-1, 743B-2, 743B-3 of the image frame 742 such that the links 72B-1, 72B-2, 72B-3 may be interpreted by imaging devices and/or computer devices, yet remain in outer portions of the image frame 742, in order to form a modified image frame 744B.

Figure 7C:
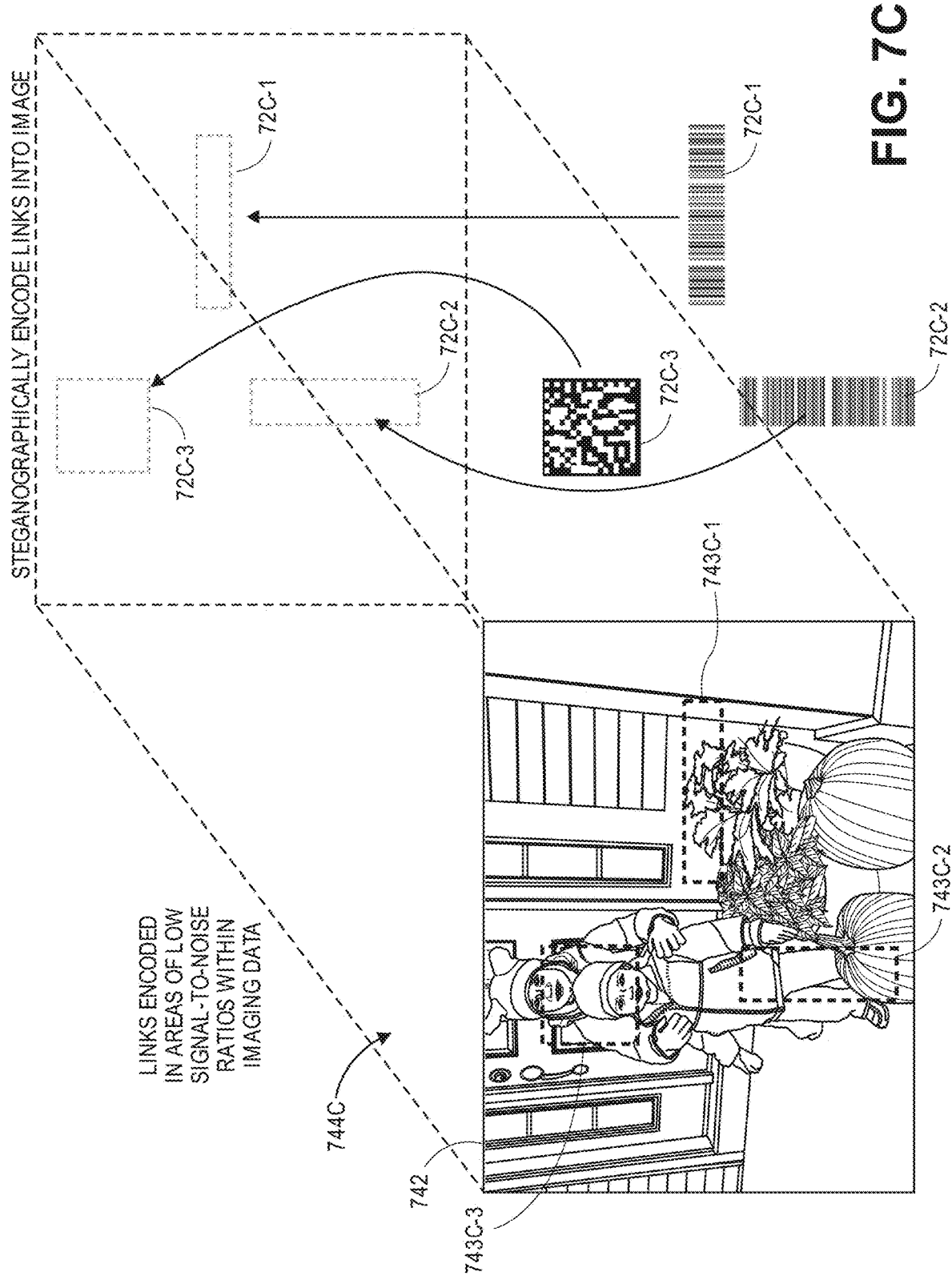

Likewise, in other embodiments, visual identifiers associated with supplemental content may be steganographically encoded into regions of an image or frame of imaging data in which a signal-to-noise ratio is relatively low. For example, representative pixels or regions of an image for steganographically encoding visual identifiers may be selected within substantially "noisy" portions of the image, e.g., portions of the image having irregular or unnatural variations in pixel characteristics such as brightness, saturation or hue, as determined by resort to metrics regarding levels of variance or signal-to-noise ratios. Thus, as is discussed above with regard to FIG. 7B, to the extent that the steganographic encoding impacts a level of clarity or resolution of the image or frame, any adverse effects of the steganographic encoding may be disposed in regions of high or varying contrasts, where such adverse effects may not be readily recognized by humans. As is shown in FIG. 7C, where the image frame 742 includes a scene having alternating or rapidly varying levels of contrast among flora within the scene, or in clothing worn by persons within the scene, a plurality of links 72C-1, 72C-2, 72C-3 (e.g., one-dimensional and/or two-dimensional bar codes) to information regarding the scene and/or objects therein (e.g., the flora, the persons or the clothing) may be generally encoded in regions 743C-1, 743C-2, 743C-3 having the low signal-to-noise ratios and/or varying levels of contrast in order to form a modified image frame 744C.

Figure 7D:
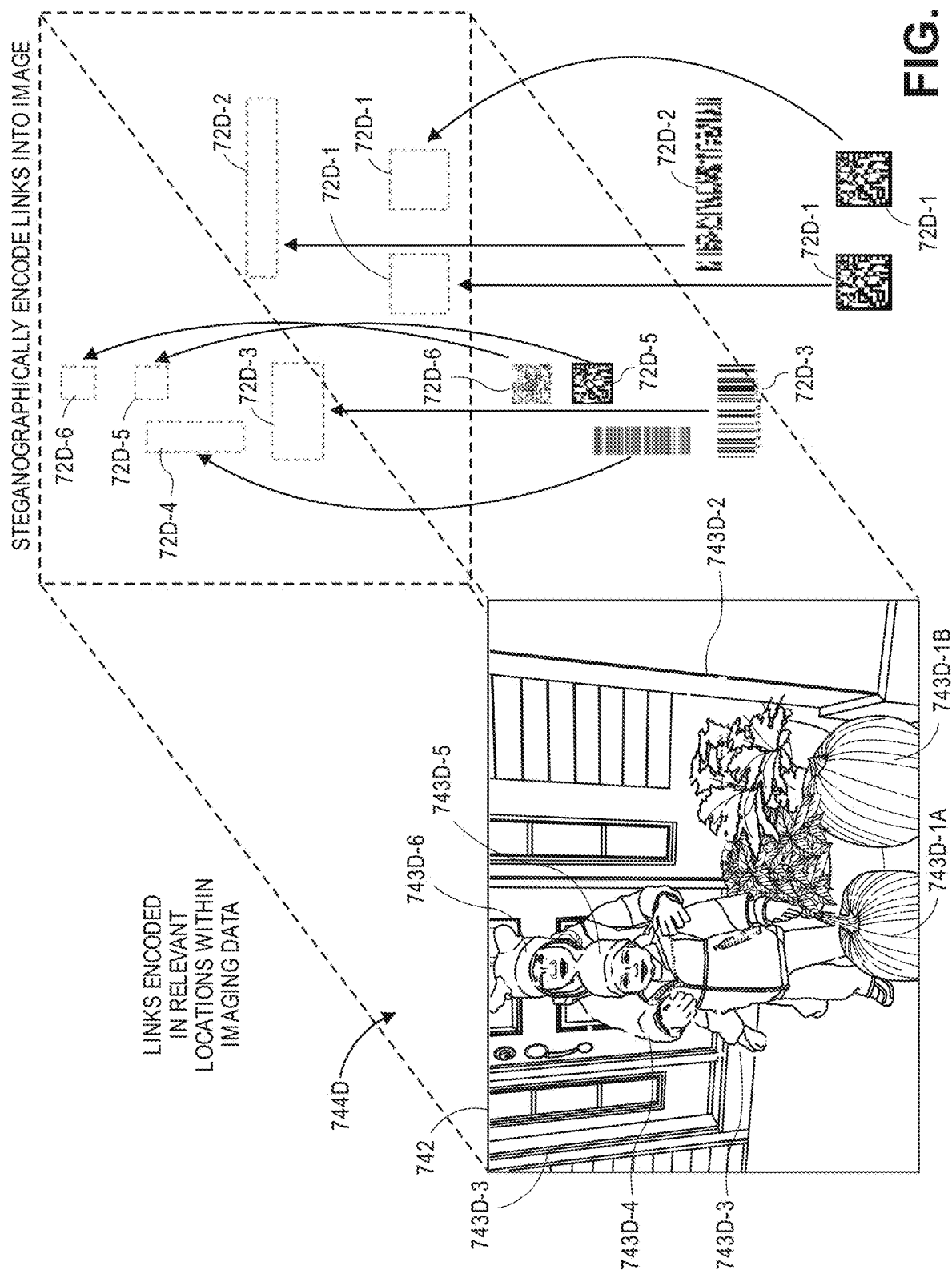

In still other embodiments, such as the embodiments discussed above with regard to FIGS. 5A through 5D, visual identifiers associated with supplemental content may be steganographically encoded into regions of imaging data to which the supplemental content is particularly relevant. As is shown in FIG. 7D, where the image frame 742 includes a scene having various commercial products or other objects such as vegetation or specific articles of clothing, a plurality of links 72D-1, 72D-2, 72D-3, 72D-4, 72D-5, 72D-6 (e.g., one-dimensional and/or two-dimensional bar codes) may be generally encoded in regions 743D-1A, 743D-1B, 743D-2, 743D-3, 743D-4, 743D-5, 743D-6 of the image frame 742 corresponding to the products or objects, in order to form a modified image frame 744D.

Figure 8A:
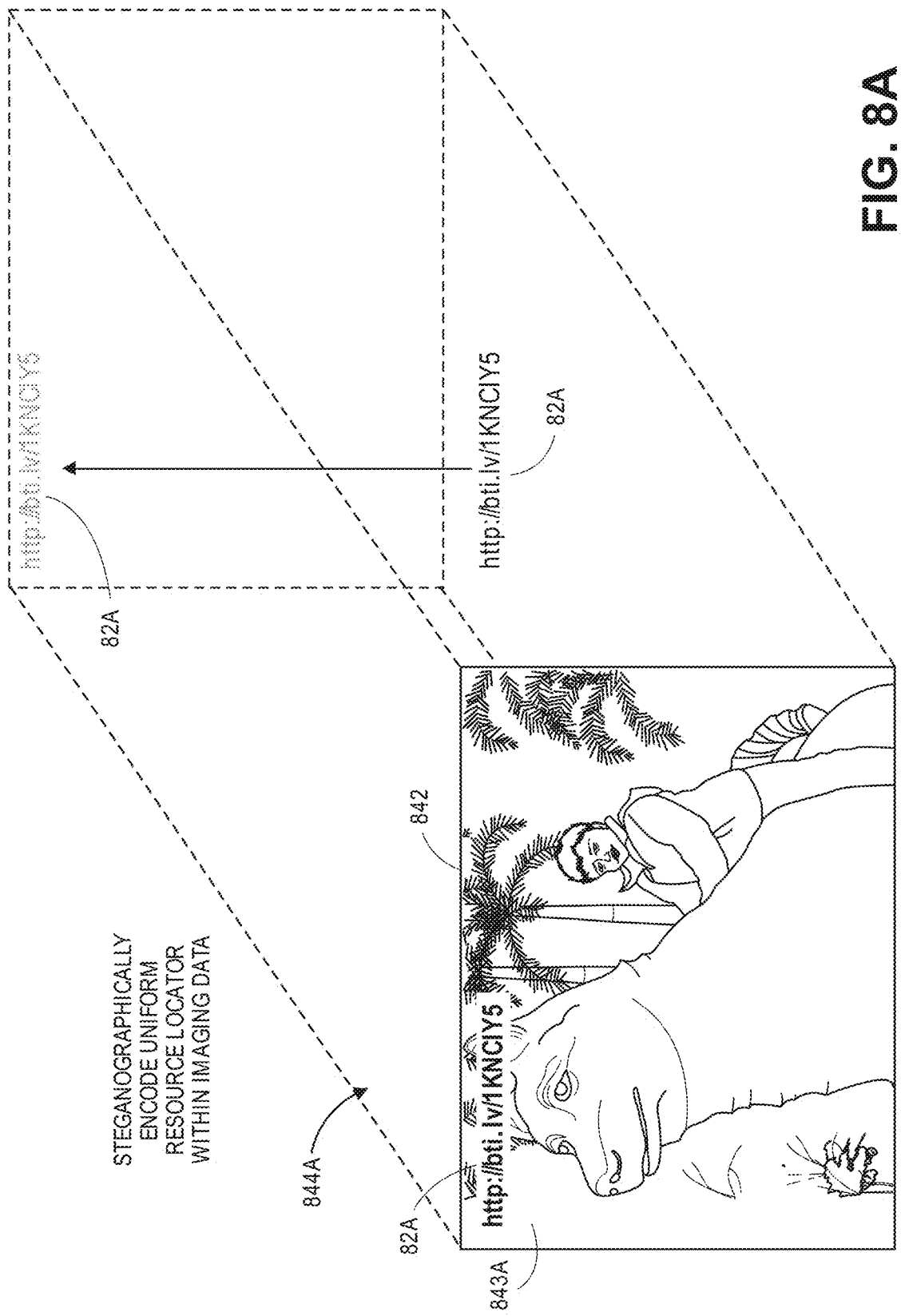

As is also discussed above, visual identifiers that are steganographically encoded into visual imaging data may include alphanumeric characters such as text, numbers or symbols. Such characters may represent links to supplemental content regarding the visual imaging data or the contents thereof, or may include supplemental content itself. Referring to FIGS. 8A and 8B, views of aspects of one system or process for steganographic camera communication in accordance with embodiments of the present disclosure are shown. Except where otherwise noted, reference numerals preceded by the number "8" shown in FIGS. 8A and 8B indicate components or features that are similar to components or features having reference numerals preceded by the number "7" shown in FIGS. 7A through 7D, by the number "5" shown in FIGS. 5A through 5D, by the number "4" shown in FIGS. 4A through 4C, by the number "2" shown in FIG. 2, or by the number "1" shown in FIGS. 1A through 1D.

As is shown in FIG. 8A, a visual identifier 82A in the form of a URL or other text-based reference to an external resource (e.g., one or more network pages) may be steganographically encoded into a portion 843A of an image frame 842, such as in or about a perimeter of the image frame 842, in order to form a modified image frame 844A. Thus, when the modified image frame 844A is displayed on a computer display, or printed into hard copy, and one or more images of the modified image frame 844A are captured, e.g., using a smartphone, a tablet computer or other computer device equipped or associated with an imaging device, the link 82A may be recognized and interpreted, and supplemental content regarding the image frame 842 and/or the contents thereof may be accessed accordingly.

As is shown in FIG. 8B, visual identifiers 82B-1, 82B-2, 82B-3, 82B-4, 82B-5, 82B-6 in the form of text-based labels or descriptors of content may be steganographically encoded into portions 843B-1, 843B-2, 843B-3, 843B-4, 843B-5A, 843B-5B, 843B-6 of the image frame 842, in order to form a modified image frame 844B. For example, where the image frame 842 depicts a child, a statue and various plant life, the visual identifier 82B-3 corresponding to a label or descriptor of the child, the visual identifier 82B-2 corresponding to a label or descriptor of the statue, or the visual identifiers 82B-1, 82B-4, 82B-5 corresponding to labels or descriptors of the plant life, may be encoded into the image frame 842. Thus, when the modified image frame 844B is displayed on a computer display, or printed into hard copy, and one or more images of the modified image frame 844B is captured, e.g., using a smartphone, a tablet computer or other computer device equipped or associated with an imaging device, the visual identifiers 82B-1, 82B-2, 82B-3, 82B-4, 82B-5, 82B-6 may be recognized and interpreted, and supplemental content regarding the image frame 842 and/or the contents thereof may be recognized and displayed accordingly.

Figure 9:
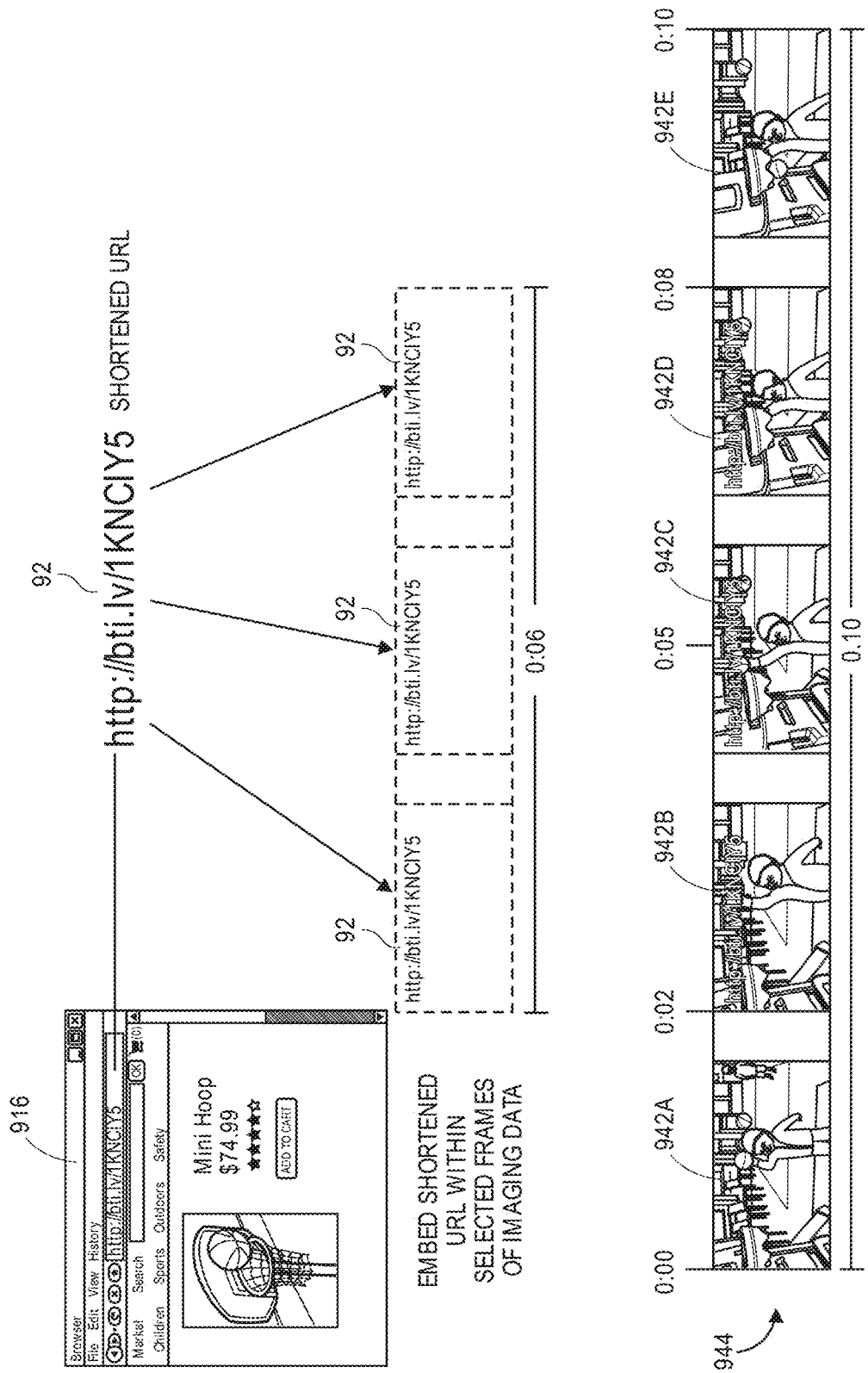
FIG. 9 is a view of aspects of one system or process for steganographic camera communication in accordance with embodiments of the present disclosure.

As is also discussed above, visual identifiers or other references to supplemental information or content may be steganographically encoded into video files, e.g., into one or more frames of moving images. Thus, as the video files are shown by a display system, a viewer of the video files may capture one or more images of the video files, and the steganographically encoded visual identifiers may be recognized and interpreted in order to access the supplemental information or content regarding the video files. Referring to FIG. 9, views of aspects of one system or process for steganographic camera communication in accordance with embodiments of the present disclosure are shown. Except where otherwise noted, reference numerals preceded by the number "9" shown in FIG. 9 indicate components or features that are similar to components or features having reference numerals preceded by the number "8" shown in FIGS. 8A and 8B, by the number "7" shown in FIGS. 7A through 7D, by the number "5" shown in FIGS. 5A through 5D, by the number "4" shown in FIGS. 4A through 4C, by the number "2" shown in FIG. 2, or by the number "1" shown in FIGS. 1A through 1D.

As is shown in FIG. 9, a plurality of image frames 942A, 942B, 942C, 942D, 942E depicting a child playing basketball on an indoor hoop are shown in series, e.g., as portions of a video file. As is also shown in FIG. 9, the indoor hoop on which the child is playing is offered for sale via a network page 916 from which customers may execute a purchase of the indoor hoop. Thus, a shortened URL 92 associated with the network page 916 may be embedded into one or more of the image frames 942A, 942B, 942C, 942D, 942E in series. For example, the image frames 942A, 942B, 942C, 942D, 942E of FIG. 9 are portions of a ten-second clip 944, and the shortened URL 92 is embedded into a six-second segment of the ten-second clip 944 that begins two seconds after a start of the ten-second clip 944 and ends two seconds prior to an end of the ten-second clip 944. Therefore, as the ten-second clip 944 is shown on a display, a user of a computer device equipped or associated with an imaging device who captures an image of the six-second segment of the ten-second clip 944 may cause the network page 916 or portions thereof to be rendered on a display via the shortened URL 92 that is steganographically embedded within the segment.

Figure 10:
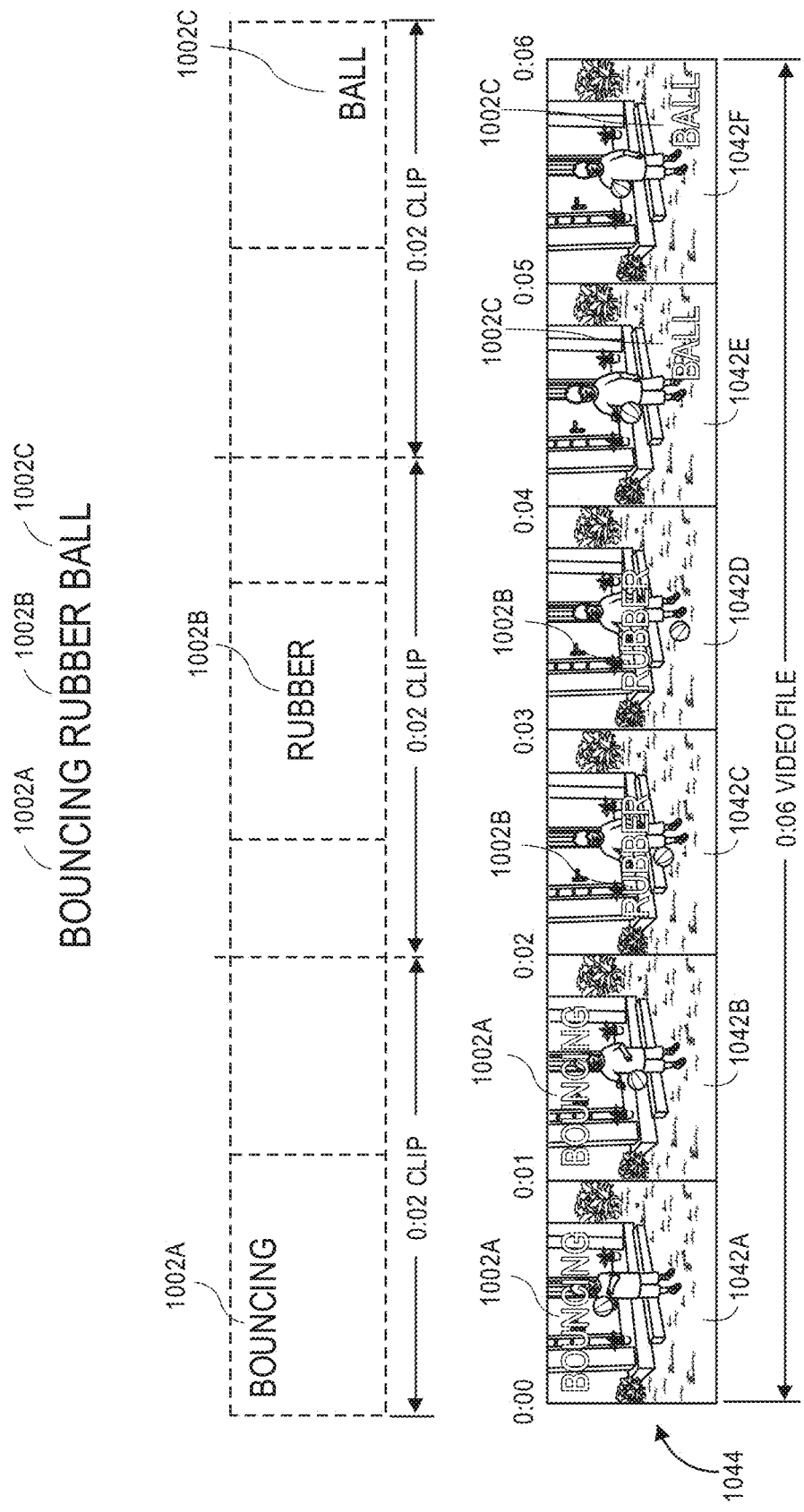
FIG. 10 is a view of aspects of one system or process for steganographic camera communication in accordance with embodiments of the present disclosure.

As is discussed above, visual identifiers that are steganographically encoded into imaging data may be varied both spatially and temporally, such that visual identifiers may be encoded and viewed in different locations with one or more rendered or displayed images, or rendered or displayed at different times within one or more of such images. Referring to FIG. 10, views of aspects of one system or process for steganographic camera communication in accordance with embodiments of the present disclosure are shown. Except where otherwise noted, reference numerals preceded by the number "10" shown in FIG. 10 indicate components or features that are similar to components or features having reference numerals preceded by the number "9" shown in FIG. 9, by the number "8" shown in FIGS. 8A and 8B, by the number "7" shown in FIGS. 7A through 7D, by the number "5" shown in FIGS. 5A through 5D, by the number "4" shown in FIGS. 4A through 4C, by the number "2" shown in FIG. 2, or by the number "1" shown in FIGS. 1A through 1D.

As is shown in FIG. 10, a plurality of image frames 1042A, 1042B, 1042C, 1042D, 1042E, 1042F depicting a child dribbling a basketball outdoors are shown in series, e.g., as portions of a video file. As is also shown in FIG. 10, a plurality of additional information 1002A, 1002B, 1002C (viz., the words "BOUNCING RUBBER BALL") associated with the content of the image frames 1042A, 1042B, 1042C, 1042D, 1042E, 1042F is identified, and embedded into the image frames 1042A, 1042B, 1042C, 1042D, 1042E, 1042F to form a modified set of imaging data 1044. In accordance with the present disclosure, the additional information 1002A, 1002B, 1002C may be encoded into different spatial locations within such frames, in order to ensure that no single region of representative pixels within the modified set of imaging data 1044 is persistently modified to encode the additional information therein. For example, as is shown in FIG. 10, the image frames 1042A, 1042B are modified to steganographically encode the additional information 1002A (viz., the word "BOUNCING") into an upper left corner of the image frames 1042A, 1042B. The image frames 1042C, 1042D are also modified to steganographically encode the additional information 1002B (viz., the word "RUBBER") into a central portion of the image frames 1042C, 1042D. The image frames 1042E, 1042F are further modified to steganographically encode the additional information 1002C (viz., the word "BALL") into a lower right portion of the image frames 1042E, 1042F. Thus, by varying the spatial locations of representative pixels that are modified to accommodate additional information (e.g., one or more bar codes, alphanumeric characters, symbols or other features), the limited risk that the additional information may be recognized by a fovea of a human eye may be mitigated.

Figure 11:
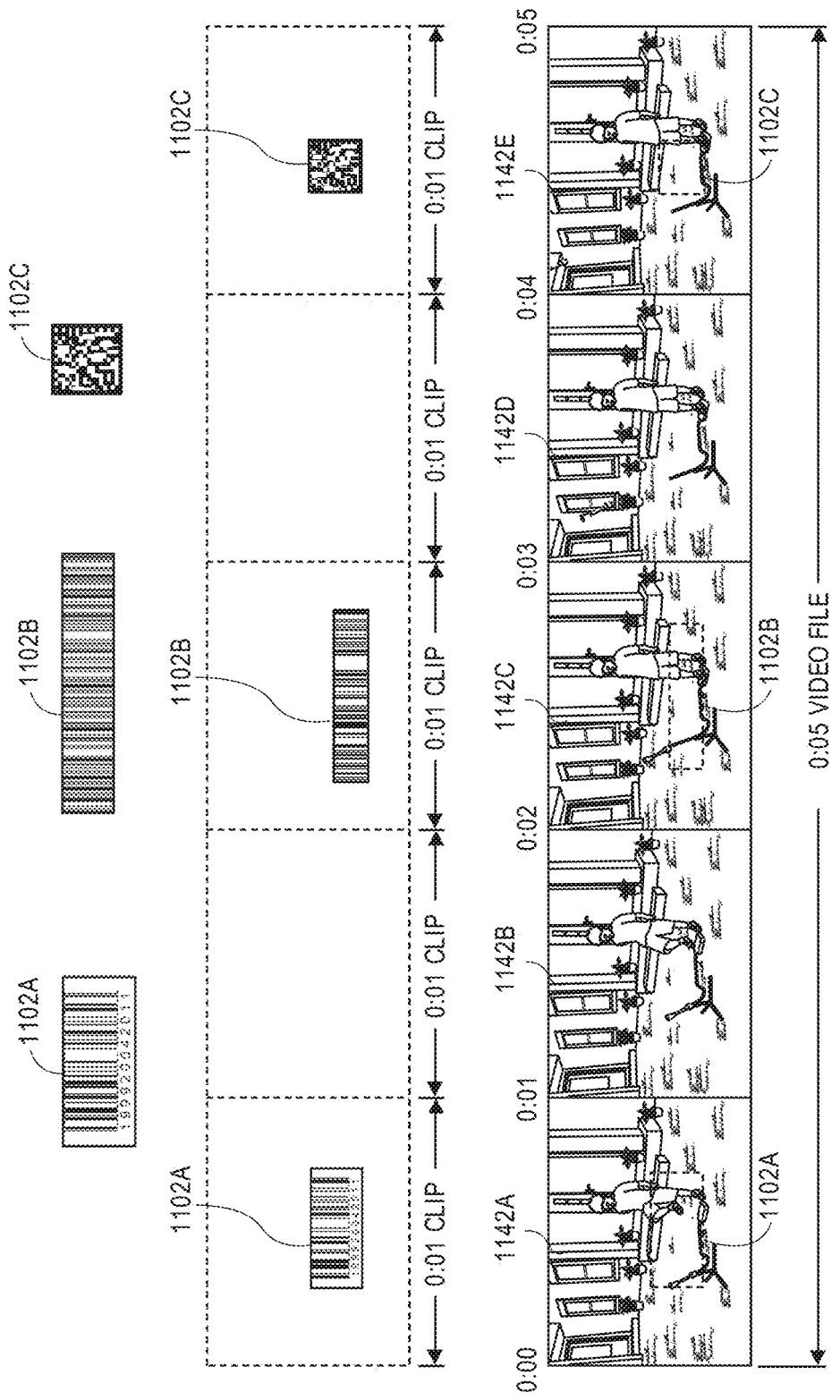
FIG. 11 is a view of aspects of one system or process for steganographic camera communication in accordance with embodiments of the present disclosure.

Likewise, the risk may also be further mitigated by displaying frames having steganographically encoded identifiers at different times. Referring to FIG. 11, views of aspects of one system or process for steganographic camera communication in accordance with embodiments of the present disclosure are shown. Except where otherwise noted, reference numerals preceded by the number "11" shown in FIG. 11 indicate components or features that are similar to components or features having reference numerals preceded by the number "10" shown in FIG. 10, by the number "9" shown in FIG. 9, by the number "8" shown in FIGS. 8A and 8B, by the number "7" shown in FIGS. 7A through 7D, by the number "5" shown in FIGS. 5A through 5D, by the number "4" shown in FIGS. 4A through 4C, by the number "2" shown in FIG. 2, or by the number "1" shown in FIGS. 1A through 1D.

As is shown in FIG. 11, a plurality of image frames 1142A, 1142B, 1142C, 1142D, 1142E depicting a child playing with a toy rocket are shown in series, e.g., as portions of a video file. As is also shown in FIG. 11, a plurality of visual identifiers 1102A, 1102B, 1102C associated with the content of the image frames 1142A, 1142B, 1142C, 1142D, 1142E is identified, and embedded into the image frames 1142A, 1142B, 1142C, 1142D, 1142E to form a modified set of imaging data 1144. The identifiers 1102A, 1102B, 1102C may relate to the child, the toy rocket, the scene or any other element expressed in the image frames 1142A, 1142B, 1142C, 1142D, 1142E. In accordance with the present disclosure, the visual identifiers 1102A, 1102B, 1102C may be encoded into common portions of different frames, in order to ensure that no single region of representative pixels within the modified set of imaging data 1144 is persistently modified to encode the additional information therein. For example, as is shown in FIG. 11, the image frame 1142A is modified to steganographically encode the visual identifier 1102A into a central portion of the image frame 1142A. The image frame 1142C is also modified to steganographically encode the visual identifier 1102B into the central portion of the image frame 1142C, and the image frame 1142E is further modified to steganographically encode the visual identifier 1102C into the same central portion of the image frame 1142E. Thus, by varying the times at which representative pixels are modified to accommodate visual identifiers therein, the limited risk that the additional information may be recognized by a fovea of a human eye may be further mitigated.

Those of ordinary skill in the pertinent arts will recognize that imaging data may be steganographically encoded to include visual identifiers and/or additional information both in different spatial locations and at different times in accordance with the present disclosure, e.g., by combining the processes or techniques described in FIGS. 10 and 11, with respect to any type of visual identifier or additional information, any spatial location in one or more image frames, or at any time.

As is discussed above, when an image of imaging data is captured in accordance with the present disclosure, the image may be searched in its entirety to determine whether the image includes any steganographically encoded visual identifiers therein. Alternatively, one or more discrete or select portions of an image may be searched for visual identifiers, or for one or more telltale indicators that the image includes one or more visual identifiers. If no such indicators are found, then a balance of the image need not be searched. If any such indicators are found, however, the balance of the image may be searched, and any visual identifiers recognized therein may be interpreted in order to identify and display supplemental information or content associated with that image or portions thereof.

Figure 12:
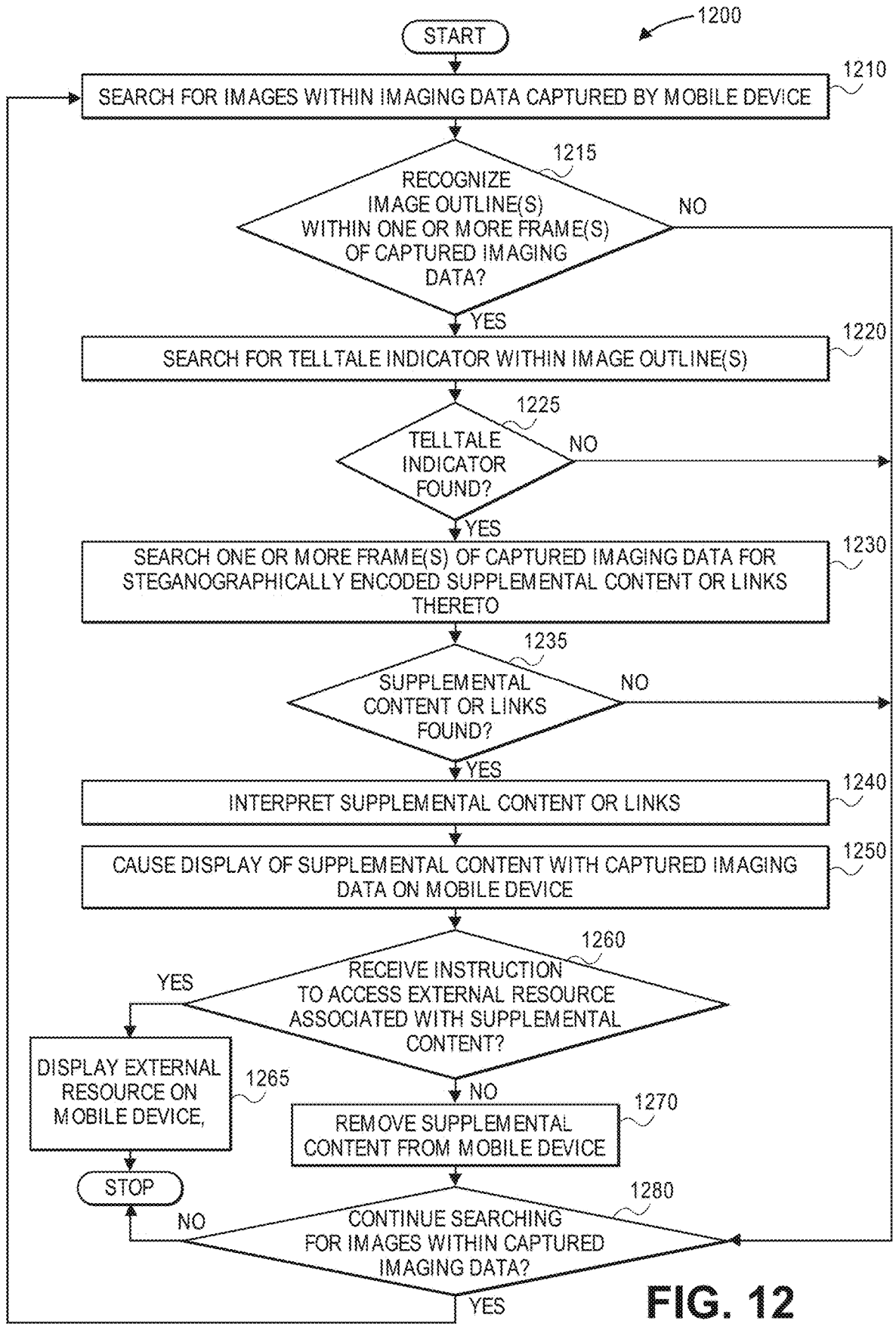
FIG. 12 is a flow chart of one process for steganographic camera communication in accordance with embodiments of the present disclosure.

Referring to FIG. 12, a flow chart 1200 of one process for steganographic camera communication in accordance with embodiments of the present disclosure is shown. At box 1210, imaging data is captured using a mobile device, and searched in order to determine whether the imaging data includes one or more images represented therein. For example, the imaging data may be evaluated to determine whether one or more polygons or other shapes or regions corresponding to a video image shown on a display are depicted therein, e.g., based on differences in relative intensities of image pixels within such shapes or regions within the imaging data as compared to a remainder of the displayed video image in order to determine whether the shapes or regions are video images.

At box 1215, whether any images are recognized within one or more frames of the captured imaging data is determined. If no such images are recognized, then the process advances to box 1280, where it is determined whether the continued searching of captured imaging data for images expressed therein is desired, e.g., in response to a user prompt. If continued searching is not desired, then the process ends. If continued searching is desired, however, then the process returns to box 1210.

If any images are recognized within the one or more frames of the captured imaging data, then the process advances to box 1220, where the outlines of such images are searched for one or more telltale indicators of steganographically encoded data. For example, a telltale indicator may be located in a predetermined portion of the image outline (e.g., a select corner, a geometric center, or any other location), such that the presence of the telltale indicator within the predetermined portion indicates that one or more visual identifiers is steganographically encoded elsewhere within the image outline, and the absence of the telltale indicator within the predetermined portion indicates that the image outline does not include any steganographically encoded visual identifiers therein. Alternatively, in some embodiments, a telltale indicator within an image outline may indicate that no steganographically encoded visual identifiers are encoded therein, while the absence of a telltale indicator may indicate that the image outline includes one or more visual identifiers. In other embodiments, a telltale indicator may also designate a location of such visual identifiers within the image outline, e.g., where the telltale indicator comprises a symbol or character indicative of locations within the outline, such as Cartesian coordinates or other labels. At box 1225, whether a telltale indicator is found within the image outline is determined. If no telltale indicators are found, then the process advances to box 1280.

If any telltale indicators are found, however, then the process advances to box 1230, where the one or more frames of the captured imaging data are searched for steganographically encoded supplemental content or links thereto. For example, after a telltale indicator is found, the imaging data may be searched for visual identifiers such as the bar code 12 of FIG. 1C or the bar codes 52A, 52B, 52C, 52D, 52E of FIGS. 5B and 5C, the shortened URL 82A of FIG. 8A, or the text-based labels or descriptors 82B-1, 82B-2, 82B-3, 82B-4, 82B-5, 82B-6 of FIG. 8B. Such identifiers may be steganographically encoded into any portion of the imaging data, such as a perimeter, a central location, a corner, an edge, or a region selected based on properties of the imaging data, e.g., an area of low signal-to-noise ratio, or a region of the imaging data selected at random. At box 1235, whether any supplemental content or links are found within the frames of the captured imaging data is determined. If no content or links are found, then the process advances to box 1280.

If any supplemental content or links thereto are found, however, then the process advances to box 1240, where the supplemental content or links are interpreted. For example, where a hyperlink or bar code associated with supplemental content residing on external resources is found within imaging data, the hyperlink or bar code may be interpreted, and the supplemental content residing thereon may be accessed accordingly. Where the supplemental content itself is found within the imaging data, however, the supplemental content may be interpreted. At box 1250, the supplemental content is displayed with the captured imaging data on the mobile device. The supplemental content may be modified, formatted, tabulated or prepared for display in any manner, e.g., within one or more windows or other user interfaces, such as the windows 54A, 54B, 54C, 54D, 54E shown in FIG. 5D, and displayed on the mobile device.

At box 1260, whether an instruction to access an external resource associated with the supplemental content has been received is determined. For example, referring again to FIG. 1D, the window 14 is displayed over the imaging data 144 on the smartphone 132 and includes both identifying information regarding the bicycle 10A shown in the imaging data as well as one or more interactive features (viz., "OK" or "CANCEL" buttons) for accessing further information regarding the bicycle 10A. Selecting the "OK" button may cause the network page 116 or other information regarding the bicycle 10A to be displayed on the mobile device 132. If an instruction to access the external resource associated with the supplemental content is not received, e.g., either in response to a selection of the "CANCEL" button shown in FIG. 1D, or following a time-out after no response is received, then the process advances to box 1270, where the supplemental content is removed from the mobile device, and to box 1280, where it is determined whether the continued searching for images within captured imaging data is desired. If the instruction to access the external resource associated with the supplemental content is received, however, then the process advances to box 1265, where the external resource is displayed on the mobile device, and the process ends.

Figure 13:
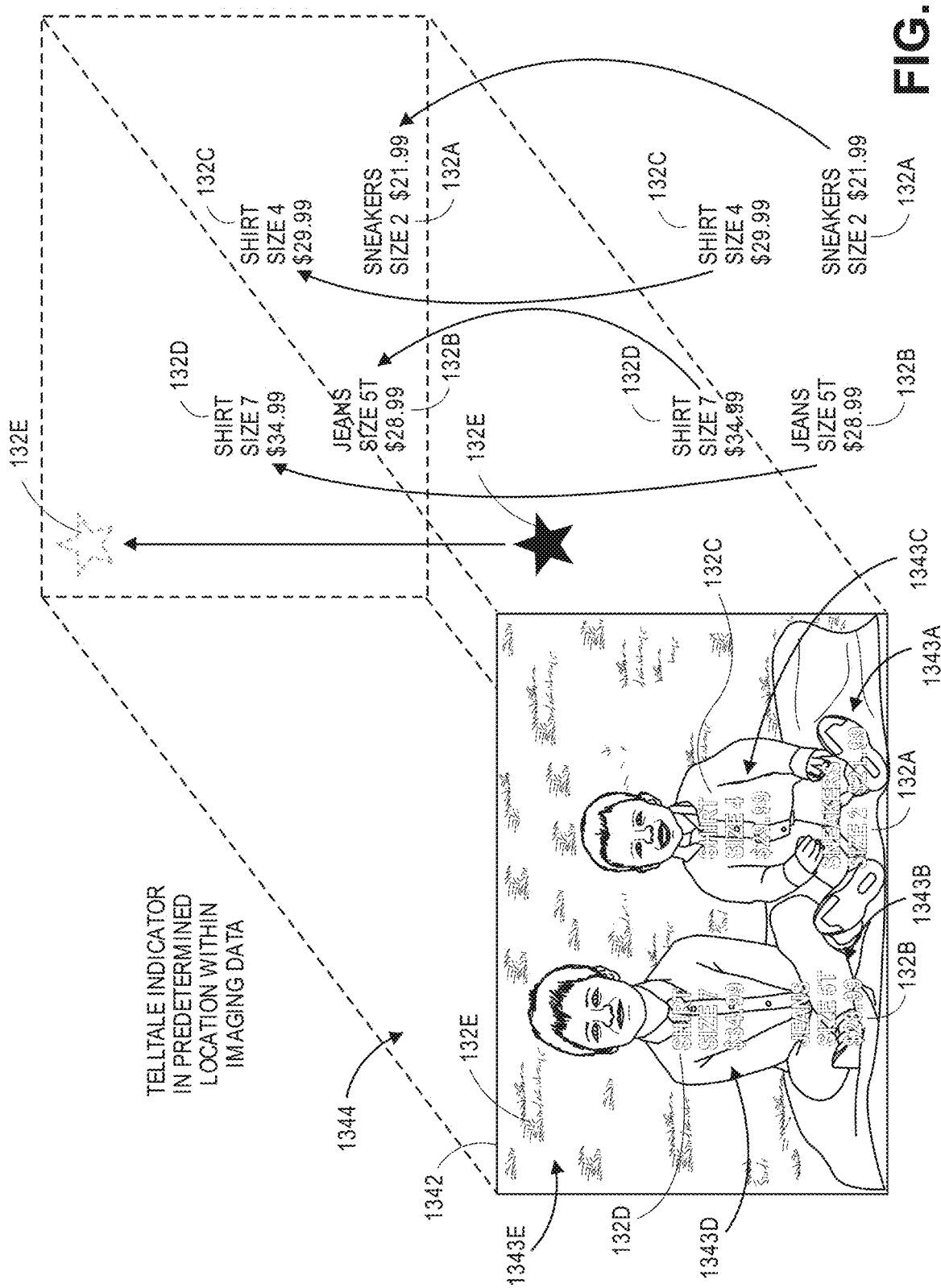
FIG. 13 is a view of aspects of one system or process for steganographic camera communication in accordance with embodiments of the present disclosure.

One example in which a telltale indicator may be steganographically encoded into visual imaging data and used to quickly indicate whether the visual imaging data includes one or more steganographically encoded visual identifiers therein is shown with regard to FIG. 13. Referring to FIG. 13, views of aspects of one system or process for steganographic camera communication in accordance with embodiments of the present disclosure are shown. Except where otherwise noted, reference numerals preceded by the number "13" shown in FIG. 13 indicate components or features that are similar to components or features having reference numerals preceded by the number "11" shown in FIG. 11, by the number "10" shown in FIG. 10, by the number "9" shown in FIG. 9, by the number "8" shown in FIGS. 8A and 8B, by the number "7" shown in FIGS. 7A through 7D, by the number "5" shown in FIGS. 5A through 5D, by the number "4" shown in FIGS. 4A through 4C, by the number "2" shown in FIG. 2, or by the number "1" shown in FIGS. 1A through 1D.

As is shown in FIG. 13, visual identifiers 132A, 132B, 132C, 132D, 132E may be steganographically encoded into a visual image 1342 to form a modified image 1344. The visual identifiers 132A, 132B, 132C, 132D may constitute or relate to supplemental content associated with the visual image 1342 and/or its contents. The visual indicator 132E is a telltale indicator (viz., a symbol, such as a star) that is also steganographically encoded into the image 1342 along with the visual identifiers 132A, 132B, 132C, 132D. Thus, when an image is captured of the modified image 1344 by a computer equipped or configured with one or more imaging devices, such as a smartphone or tablet computer, the computer may be configured to search a portion of the modified image 1344, such as the upper left corner, to determine whether that portion of the modified image 1344 includes a telltale indicator, e.g., the visual identifier 132E. If no such indicator is found, then a remainder or balance of the modified image 1344 other than the upper left corner need not be searched. If such an indicator is found, however, then the remainder or the balance of the modified image 1344 will be searched for one or more visual identifiers, e.g., the visual identifiers 132A, 132B, 132C, 132D, which may then be recognized, interpreted and/or displayed by the computer. Alternatively, the presence of the visual identifier 132E within the modified image 1344 may indicate that no other steganographically encoded visual identifiers are encoded therein, or may identify or suggest a location of such visual identifiers within the modified image 1344.

Configuring a computer such as a smartphone, a tablet computer or another mobile device that is equipped or configured with one or more imaging devices to search first for telltale indicators in predetermined locations of image files may greatly enhance the speed and efficiency with which supplemental content is displayed in association with such image files. In some embodiments, searching predetermined locations for telltale indicators may be particularly useful for evaluating video files, e.g., a plurality of moving images. If a telltale indicator is not found within the predetermined locations, then the remainder of the images need not be searched, thereby freeing up processing power, available memory and/or bandwidth for other purposes. If one or more telltale indicators are found, however, then the remainder of the images should be searched in order to locate one or more visual identifiers therein. Although the visual identifier 13E of FIG. 13 is shown in the form of a five-pointed star in the upper left corner of the modified image 1344, those of ordinary skill in the pertinent arts will recognize that a telltale indicator may be any other shape, or may include any number of characters (e.g., text, numbers or symbols), or may be located in any location within imaging data, in accordance with embodiments of the present disclosure, and that such embodiments are not limited to star-shaped indicators provided in upper left portions of image outlines or frames.

In some embodiments of the present disclosure, visual indicators of supplemental information or content may be steganographically encoded into live video feeds, e.g., in real time or in near-real time, prior to broadcasting the live video feeds to viewers. For example, because many televised events are aired in accordance with a mandatory broadcast delay of a predetermined duration, e.g., six to seven seconds, in order to scrub or block any profanity or objectionable content that may have been captured prior to broadcast, the video feeds may be modified to include any steganographic visual identifiers associated with the content therein during the period associated with the broadcast delay.

Figure 14:
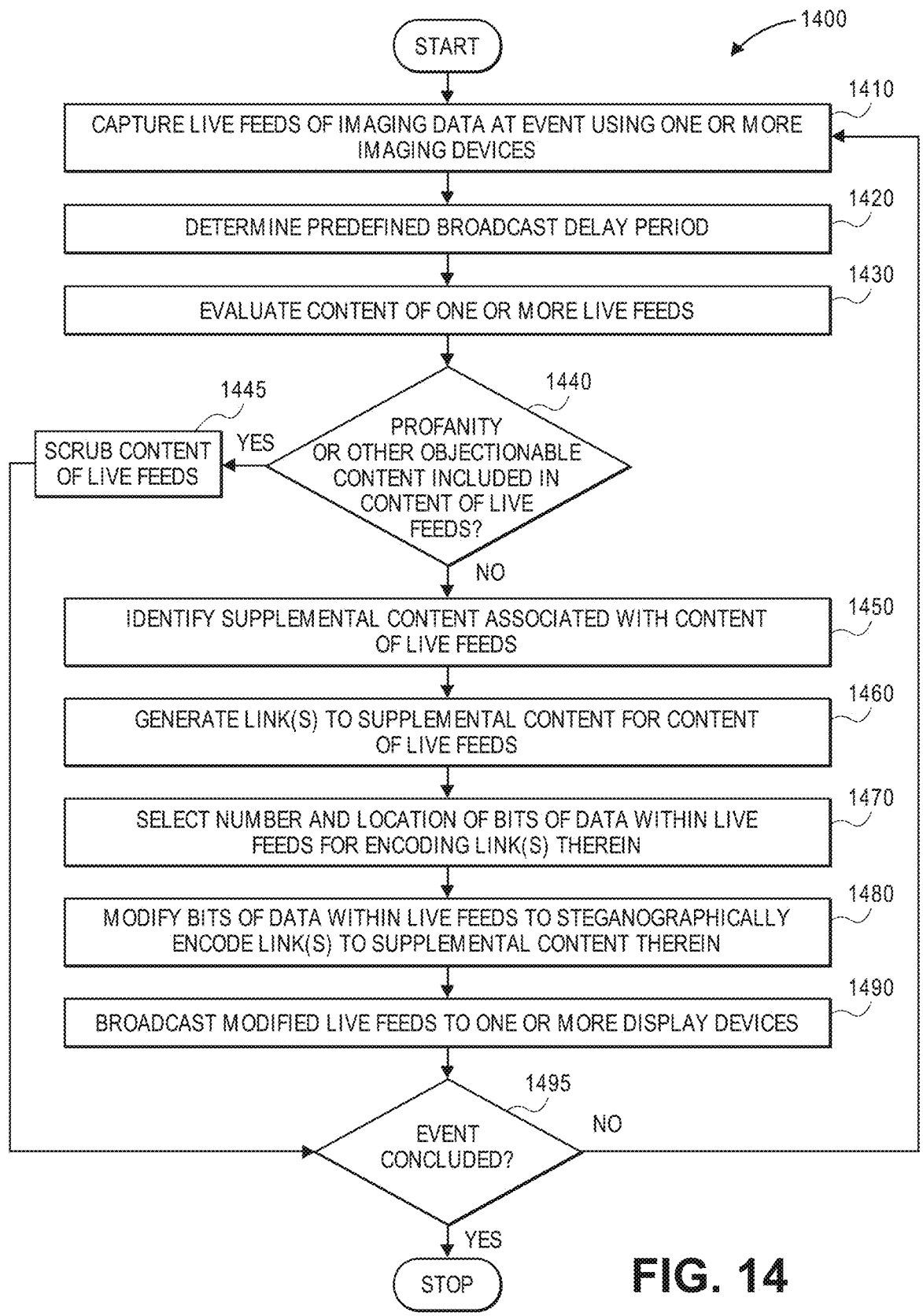
FIG. 14 is a flow chart of one process for steganographic camera communication in accordance with embodiments of the present disclosure.

Referring to FIG. 14, a flow chart 1400 of one process for steganographic camera communication in accordance with embodiments of the present disclosure is shown. At box 1410, live feeds of imaging data are captured from an event using one or more imaging devices. For example, the event may an evening newscast, a sporting event, a musical performance, a press conference, or any other event in which the activities at the event are covered by one or more imaging devices (e.g., cameras) that are aligned to capture imaging data during the event and distribute the imaging data for broadcast in near-real time.

At box 1420, a predefined broadcast delay period may be determined. For example, the delay period may be a minimum requirement established by law or regulation. Alternatively, the broadcast delay may be established as a matter of internal policy, or governed by physical or virtual restrictions on the preparation, transmission, capture and/or display of such visual data. At box 1430, the content of one or more of the live feeds is evaluated, e.g., using one or more computer processors.

At box 1440, whether the content of the one or more live feeds includes any profanity or other objectionable content is determined. If any profanity or other objectionable content is detected within the content of the one or more live feeds, then the process advances to box 1445, where the content of the live feeds is scrubbed, and to box 1495, where it is determined whether the event has concluded. If the event has not concluded, then the process returns to box 1410, where the live feeds continue to be captured. If the event has concluded, however, then the process ends.

If no profanity or other objectionable content has been identified in the content of the live feeds, then the process advances to box 1450, where supplemental content associated with the content of the live feeds is identified. Such supplemental content may be information or data that pertains to the live feeds in any way, e.g., to a scene or setting from which the imaging data in the live feeds is captured, or to one or more of the objects depicted or represented therein. At box 1460, one or more links to the supplemental content for the content of the live feeds are generated. For example, the links may direct to one or more external resources where the supplemental content may be found, or may be configured to trigger the execution of one or more intrinsic processes within an imaging device and/or computer device that captures them. Alternatively, in some embodiments, a visual identifier including the supplemental content itself may be generated.

At box 1470, a number and location of bits of data within the live feeds for encoding the link(s) therein are selected. For example, a number of the bits of data may be selected based on the size, shape, dimensions and/or content of the link(s). Likewise, the location of such bits may be a standard, predetermined location (e.g., a common location within one or more frames of the imaging data where viewing software may be trained to search), a general location (e.g., centrally located within frames of the imaging data), or in locations pertaining to the content to which the linked supplemental content relates, such as is shown in FIGS. 5A and 5C, FIG. 8B or FIG. 13. At box 1480, the bits of data in the location and number selected at box 1470 within the live feeds are modified to steganographically encode the links to the supplemental content therein. For example, as is discussed above, one or more least significant bits or less significant bits of color channels of representative pixels in the regions selected at box 1470 may be altered in order to create a contrast that defines the links, and is visible or may be interpreted by one or more computer devices, but is imperceptible to the human eye.

At box 1490, the modified live feeds are broadcast to one or more display devices at the conclusion of the predefined broadcast delay. For example, where a broadcast provider has implemented a nominal period of delay (e.g., seven seconds) between when imaging data constituting a live feed has been captured, and when the imaging data of the live feed is scheduled to be broadcast, e.g., to enable for a review of the imaging data for profanity or objectionable content, such as at box 1440, the imaging data may be modified to include one or more links to supplemental content within the period of delay and broadcast as "live," in near-real time, on schedule. Alternatively, a longer period of delay may be imposed, as necessary, in order to accommodate the identification of supplemental content, the generation of links to the supplemental content, and the selection and modification of bits of data to steganographically include such links. At box 1495, whether the event has concluded is determined. If the event has not concluded, then the process returns to box 1410, where the live feeds continue to be captured. If the event has concluded, however, then the process ends.

Figure 15A:
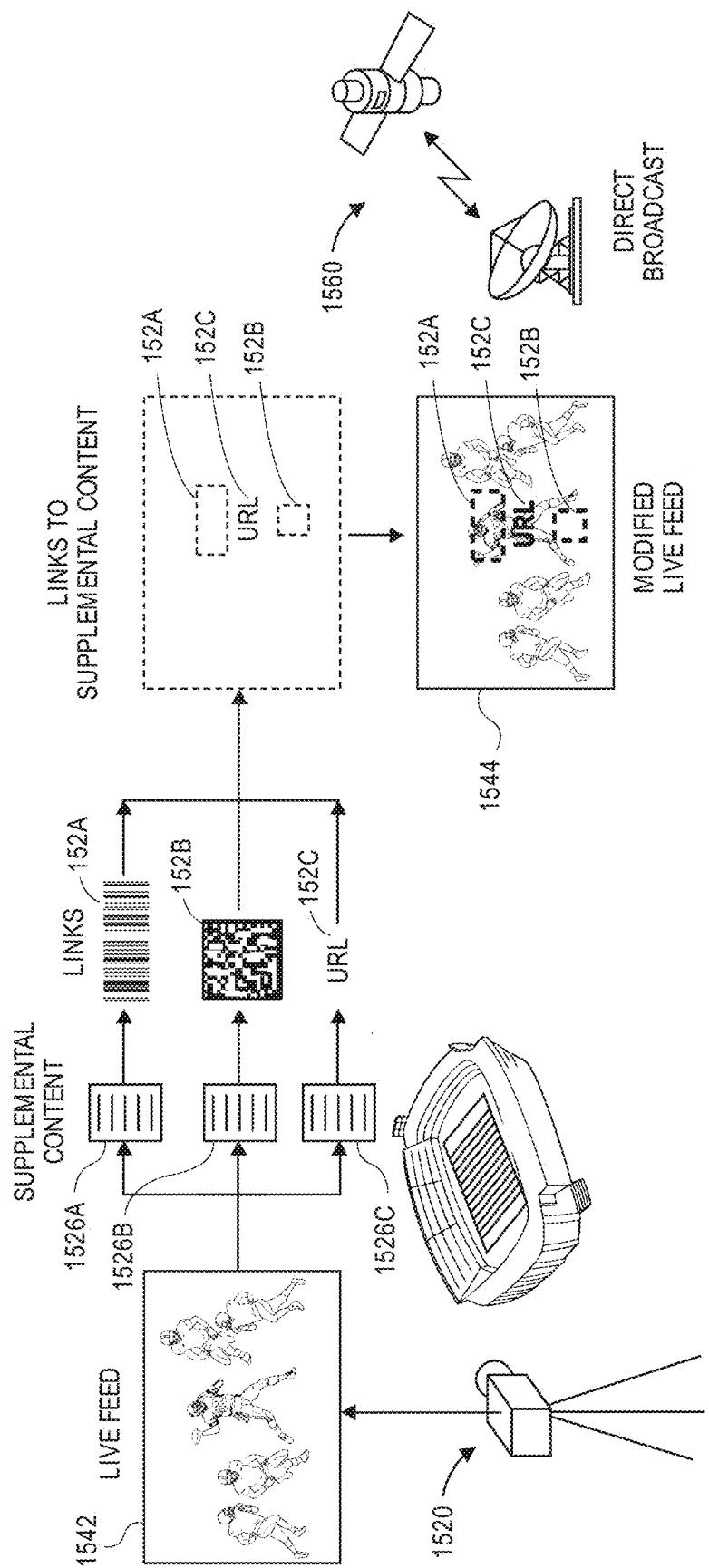
FIGS. 15A and 15B are views of aspects of one system or process for steganographic camera communication in accordance with embodiments of the present disclosure.
Figure 15B:
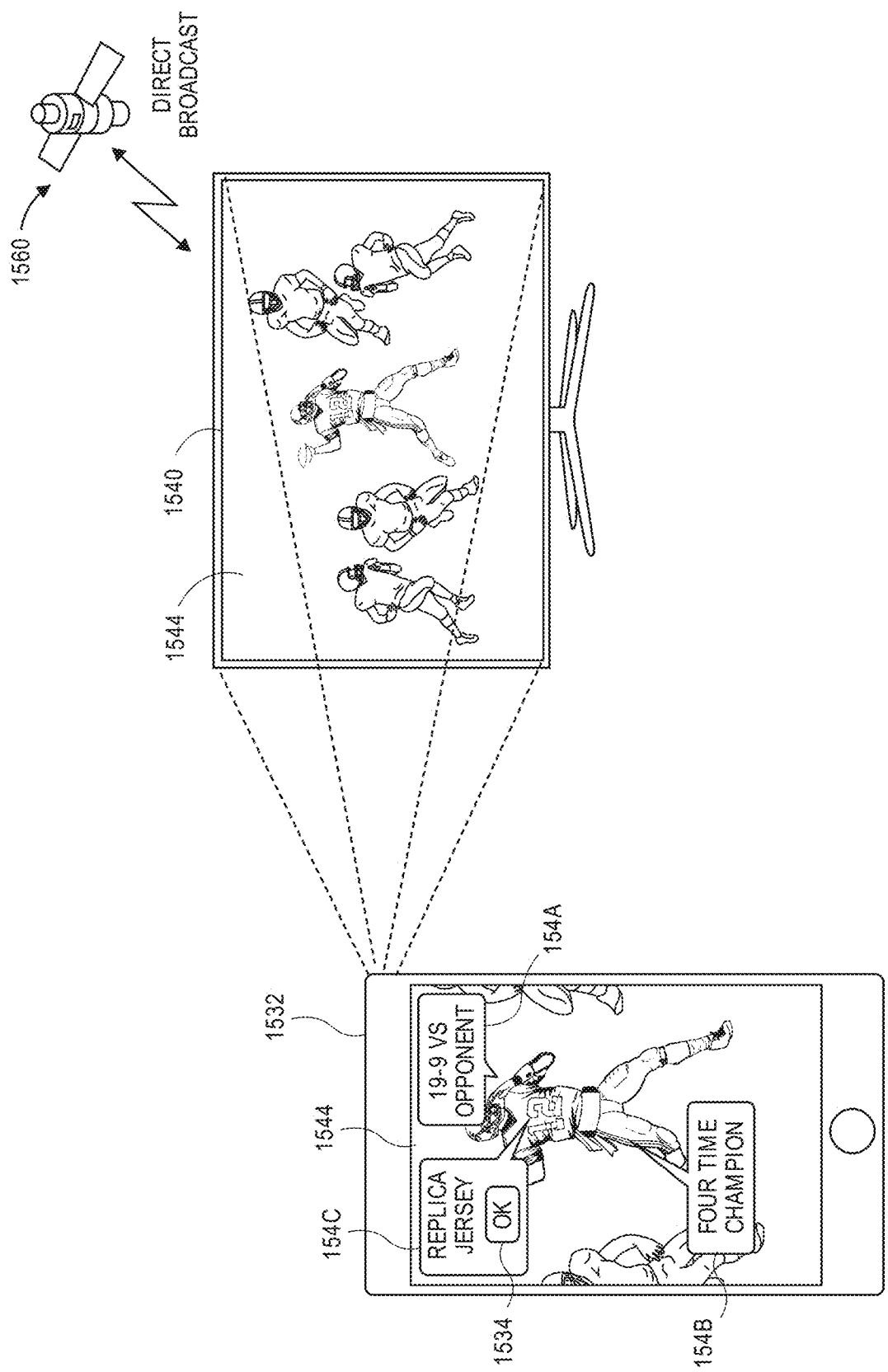

Referring to FIGS. 15A and 15B, views of aspects of one system or process for steganographic camera communication in accordance with embodiments of the present disclosure are shown. Except where otherwise noted, reference numerals preceded by the number "15" shown in FIGS. 15A and 15B indicate components or features that are similar to components or features having reference numerals preceded by the number "13" shown in FIG. 13, by the number "11" shown in FIG. 11, by the number "10" shown in FIG. 10, by the number "9" shown in FIG. 9, by the number "8" shown in FIGS. 8A and 8B, by the number "7" shown in FIGS. 7A through 7D, by the number "5" shown in FIGS. 5A through 5D, by the number "4" shown in FIGS. 4A through 4C, by the number "2" shown in FIG. 2, or by the number "1" shown in FIGS. 1A through 1D.

As is shown in FIG. 15A, one or more imaging devices 1520 may capture live feeds of imaging data 1542 associated with an event (e.g., a sporting event). The live feeds 1542 may be processed in order to recognize the content therein, e.g., based on edges, contours, outlines, colors, textures, silhouettes, shapes or other characteristics of objects or portions thereof shown in the live feeds. Based on such content, supplemental content 1526A, 1526B, 1526C may be identified. The supplemental content may relate to a setting of the event, one or more participants in the event, one or more environmental conditions or attributes of the event, or activities taking place during the event. After the supplemental content 1526A, 1526B, 1526C has been identified, links 152A, 152B, 152C or other visual identifiers relating to the supplemental content 1526A, 1526B, 1526C (e.g., one-dimensional bar codes, two-dimensional bar codes, or URLs linked to external resources having access to the supplemental content 1526A, 1526B, 1526C) may be generated and steganographically encoded into the live feeds 1542, in order to create a modified live feed 1544. The modified live feed 1544 may then be broadcast to one or more subscribers and/or display devices, or accessories thereto, that may be configured to display the modified live feed 1544 thereon, such as by a direct broadcast system 1560 or any other system or method for transmitting audio and/or video content.

As is shown in FIG. 15B, when the modified live feed 1544 is received at a display device (e.g., a television) 1540 via the direct broadcast system 1560, a user of a smartphone 1532 or other device having an imaging device (e.g., digital camera) and one or more computer processors may be may oriented to capture all or a portion of the display device 1540 and the modified live feed 1544 rendered thereon within a field of view. Subsequently, one or more of the links 152A, 152B, 152C that are steganographically encoded into the modified live feed 1544 may be recognized and interpreted by the smartphone 1532, and the supplemental content 1526A, 1526B, 1526C associated with the links 152A, 152B, 152C may be accessed and displayed in a plurality of windows 154A, 154B, 154C. For example, as is shown in FIG. 15B, the windows 154A, 154B may refer or relate to one or more aspects of the events depicted in the modified live feed 1544 or the participants thereof, while the window 154C may include a user interface 1534 for executing one or more commercial opportunities relating to such events, viz., a purchase of an article of clothing worn by a participant in the events depicted in the modified live feed 1544.

Those of ordinary skill in the pertinent arts will recognize that one or more of the systems and methods for steganographic communication disclosed herein may be utilized in any number of fields. In particular, those of ordinary skill will recognize that visual identifiers and/or additional information (e.g., supplemental content) may be steganographically encoded into imaging data by anyone who owns or controls the imaging data, or that such identifiers, information or content may be embedded therein at any time. For example, one or more of the systems and methods disclosed herein may be incorporated in or used by commercial-grade or large-scale image processing applications, and also by applications operated by traditional users of household computer devices such as laptop, desktop or tablet computers or smartphones. When a home movie or other video file is captured, the movie or video file may be augmented with visual identifiers or additional information referring or relating to content of the movie or video file in real time or near-real time, or at a later time.

Moreover, visual identifiers or additional information may be steganographically encoded into, and removed from, imaging data on any number of occasions. For example, when a movie is produced for display in a theater or other public forum, a first set of visual identifiers may be steganographically encoded therein. When the movie is later prepared for release via a streaming media service, the first set of visual identifiers may be removed therefrom and a second set of visual identifiers may be steganographically encoded therein. When the movie is further prepared for release in a hard storage format (e.g., a DVD, a stick drive or another physically portable format), the second set of visual identifiers may be removed therefrom and a third set of visual identifiers may be steganographically encoded therein. Likewise, with regard to television programs, a first set of visual identifiers may be steganographically encoded therein for a live or first-airing of a television program, and a second set of visual identifiers may be encoded therein for a rerun or second airing of the television program, and a third set of visual identifiers may be encoded therein for a syndicated release of the television program. As yet another example, when a print advertisement (e.g., a billboard, a magazine article, a subway placard) is prepared for distribution in a number of locations and includes an image depicting a number of commercial objects therein, copies of the print advertisement may be steganographically encoded with different visual identifiers and/or additional information relating to such commercial objects, including but not limited to identifiers of different nearby brick-and-mortar locations where such commercial objects may be purchased.

Moreover, in some embodiments, rather than changing the visual identifiers that are steganographically encoded into imaging data in order to link to different sets of additional content, the imaging data may be associated with different sets of additional content by leaving the visual identifiers in place, and modifying associations of such identifiers with external resources on a back end, e.g., by one or more server-side applications, such that the visual identifiers may be associated with different content when the visual identifiers are interpreted.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, although some of the embodiments described herein or shown in the accompanying figures refer to the processing of imaging data that is in color, e.g., according to an RGB color model, the systems and methods disclosed herein are not so limited, and may be used to process any type of information or data that is provided in color according to any color model, or in black-and-white or grayscale. In some embodiments, the systems and methods disclosed herein may be used in connection with three-channel, 24-bit visual imaging data having supplemental content encoded therein. In other embodiments, however, visual imaging data having any number of channels or bits thereof may be used to encode content therein. Furthermore, those of ordinary skill in the pertinent arts will recognize that any type of content (e.g., supplemental content) may also be encoded into any type or form of imaging data in accordance with the present disclosure, including but not limited to color imaging data, black-and-white imaging data, grayscale imaging data or depth imaging data.

Additionally, although some of the embodiments disclosed herein reference the encoding of supplemental content or links thereto into imaging data that was previously obtained, those of ordinary skill in the pertinent arts will readily recognize that any content may be steganographically encoded into any imaging data at any time, even if the content and the imaging data are obtained simultaneously. Moreover, content may be steganographically encoded into any type or form of image file, including but not limited to computer-generated imagery, and the systems and methods disclosed herein are not limited to the use of still or moving images that were captured using one or more imaging devices, such as digital cameras.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIG. 3, 6, 12 or 14, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A computer-implemented method comprising:
    identifying an image of at least a portion of a scene by at least one computer processor;
    extracting information regarding at least one of an edge, a contour, an outline, a color, a texture, a silhouette or a shape within the image of at least the portion of the scene by the at least one computer processor;
    determining that the at least one of the edge, the contour, the outline, the color, the texture, the silhouette or the shape corresponds to an object by the at least one computer processor;
    identifying content relating to at least one of the scene or the object by the at least one computer processor, wherein the content relating to at least one of the scene or the object is maintained in at least one data store;
    generating a link to the content relating to at least one of the scene or the object by the at least one computer processor;
    modifying the image by the at least one computer processor, wherein modifying the image comprises steganographically encoding the link into a portion of the image; and
    storing the modified image in at least one data store.

2. The computer-implemented method of claim 1, wherein modifying the image further comprises:
    determining a location of the at least one of the edge, the contour, the outline, the color, the texture, the silhouette or the shape within the image by the at least one computer processor, wherein the portion of the image is the location of the at least one of the edge, the contour, the outline, the color, the texture, the silhouette or the shape within the image; and
    determining a pattern associated with the link by the at least one computer processor; and
    selecting a plurality of representative pixels in the portion of the image corresponding to the pattern associated with the link by the at least one computer processor, wherein the link is steganographically encoded into the plurality of representative pixels.

3. The computer-implemented method of claim 2, wherein steganographically encoding the link into the portion of the image comprises:
    identifying a plurality of bits of at least some of the representative pixels in the portion of the image corresponding to the pattern associated with the link by the at least one computer processor; and
    steganographically modifying the plurality of bits to generate a visual contrast within the portion of the image, wherein the visual contrast is not visible to a human eye.

4. The computer-implemented method of claim 1, wherein identifying the content relating to at least one of the scene or the object comprises:
    determining that the object is a commercial product by the at least one computer processor based at least in part on the at least one of the edge, the contour, the outline, the color, the texture, the silhouette or the shape, wherein the content relating to at least one of the scene or the object is at least one network page offering the commercial product for sale.

5. The computer-implemented method of claim 1, wherein identifying the image of at least the portion of the scene comprises:
   capturing the image of at least the portion of the scene by at least one imaging device, wherein the portion of the scene is within a field of view of the at least one imaging device; and
   wherein the method further comprises:
   causing a display of the modified image on at least one display device over a network.

6. A server comprising:
   at least one computer processor; and
   at least one data store having at least one or more instructions stored thereon,
   wherein the server, upon executing the one or more instructions, is configured to at least:
   identify a series of image frames maintained in the at least one data store;
   extract information regarding at least one of an edge, a contour, an outline, a color, a texture, a silhouette or a shape depicted within at least the subset of the series of image frames;
   determine that the at least one of the edge, the contour, the outline, the color, the texture, the silhouette or the shape depicted within at least the subset of the series of image frames depicts at least one item in at least a portion of a scene;
   identify content relating to the at least one item;
   generate at least one link to at least a portion of the content;
   steganographically embed the at least one link into portions of each of the image frames of the subset depicting the at least one of the edge, the contour, the outline, the color, the texture, the silhouette or the shape;
   store a video file comprising the series of image frames in the at least one data store,
   wherein the video file comprises the subset of the series of image frames having the at least one link steganographically embedded therein;
   transmit, over at least one computer network, the video file to a first device comprising at least a first display;
   receive, over the at least one computer network, a request for at least the portion of the content from a second device comprising at least one camera, wherein the request comprises the link; and
   transmit, over the at least one computer network, at least some of the content to the second device.

7. The server of claim 6, wherein the server, upon executing the one or more instructions, is further configured to at least:
   determine a pattern associated with the at least one link;
   select a plurality of representative pixels in each of the subset of the series of image frames corresponding to the pattern;
   identify a plurality of bits of at least some of the plurality of representative pixels in each of the subset of the series of image frames corresponding to the pattern; and
   modify the plurality of bits in each of the subset of the series of image frames to generate a visual contrast that is not visible to the human eye.

8. The server of claim 6, wherein the link is one of:
   a uniform resource locator of at least one network site having the content;
   a bar code having the uniform resource locator of the at least one network site encoded therein; or
   a plurality of characters comprising at least some of the content.

* * * * *